United States Patent
Mori

(10) Patent No.: US 9,448,746 B2
(45) Date of Patent: Sep. 20, 2016

(54) PRINTING SYSTEM, METHOD FOR CONTROLLING THE PRINTING SYSTEM, AND PROGRAM

(75) Inventor: Junichi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 12/772,095

(22) Filed: Apr. 30, 2010

(65) Prior Publication Data

US 2010/0321706 A1    Dec. 23, 2010

(30) Foreign Application Priority Data

Jun. 18, 2009    (JP) ................................ 2009-145378

(51) Int. Cl.
| | | |
|---|---|---|
| *G06F 15/00* | (2006.01) | |
| *G06K 1/00* | (2006.01) | |
| *G06F 3/12* | (2006.01) | |
| *G03G 15/00* | (2006.01) | |

(52) U.S. Cl.
CPC ........... *G06F 3/1204* (2013.01); *G03G 15/502* (2013.01); *G03G 15/5087* (2013.01); *G03G 15/6508* (2013.01); *G03G 15/6541* (2013.01); *G03G 15/6582* (2013.01); *G06F 3/1264* (2013.01); *G06F 3/1282* (2013.01); *G03G 2215/00109* (2013.01); *G03G 2215/00725* (2013.01)

(58) Field of Classification Search
None
See application file for complete search history.

(56) References Cited

U.S. PATENT DOCUMENTS

| | | | | |
|---|---|---|---|---|
| 4,687,191 A * | 8/1987 | Stemmle | ................... | 270/58.15 |
| 4,801,133 A | 1/1989 | Ishiguro et al. | | |
| 5,161,037 A | 11/1992 | Saito | | |
| 5,832,358 A | 11/1998 | Sampath | | |
| 5,987,300 A | 11/1999 | Mori | | |
| 6,010,127 A | 1/2000 | DiCesare | | |
| 6,104,496 A * | 8/2000 | Minowa et al. | ............. | 358/1.12 |
| 6,850,719 B2 | 2/2005 | Nagaya | | |
| 7,281,707 B2 * | 10/2007 | Moriyama et al. | ........ | 270/58.04 |
| 2002/0023071 A1 * | 2/2002 | Takahashi | ......................... | 707/1 |

(Continued)

FOREIGN PATENT DOCUMENTS

| | | |
|---|---|---|
| CN | 1837002 A | 9/2006 |
| EP | 1293841 A2 | 3/2003 |

(Continued)

OTHER PUBLICATIONS

U.S. Appl. No. 12/772,078, filed Apr. 30, 2010, Kiyoshi Tokashiki; Kazuhiko Ushiyama.

*Primary Examiner* — John Wallace
(74) *Attorney, Agent, or Firm* — Canon USA, Inc. I.P. Division

(57) ABSTRACT

A control method for controlling a printing system that includes selectively executing an inline job and an offline job, where the inline job is for executing post-processing on a sheet printed by a printing apparatus by using a post-processing apparatus and the offline job is for executing post-processing on a sheet without executing printing by the printing apparatus by using the post-processing apparatus. The method includes detecting that a sheet has been set in a paper feed unit, setting whether to execute an offline job that uses the sheet if the sheet is detected as being set in the paper feed unit, and controlling the post-processing apparatus to automatically start post-processing corresponding to the offline job in a case where both the system is set to execute the offline job and the system detects that the sheet has been set in the paper feed unit.

18 Claims, 18 Drawing Sheets

(56) References Cited

U.S. PATENT DOCUMENTS

| | | |
|---|---|---|
| 2003/0050978 A1* | 3/2003 | Cannon et al. .............. 709/204 |
| 2004/0190057 A1 | 9/2004 | Takahashi |
| 2006/0214347 A1* | 9/2006 | Iizuka et al. ............... 270/58.14 |
| 2006/0285126 A1* | 12/2006 | Braswell ............. H04L 41/0803 358/1.1 |
| 2007/0127065 A1 | 6/2007 | Nishizawa |
| 2007/0171454 A1 | 7/2007 | Takahashi |
| 2007/0171455 A1 | 7/2007 | Tominaga |
| 2007/0279646 A1 | 12/2007 | Sugimoto et al. |
| 2008/0024807 A1 | 1/2008 | Matsuda |
| 2009/0087242 A1 | 4/2009 | Sato |
| 2009/0141301 A1 | 6/2009 | Cornelissen |

FOREIGN PATENT DOCUMENTS

| | | |
|---|---|---|
| JP | 61-111260 A | 5/1986 |
| JP | S63-139873 A | 6/1988 |
| JP | 08-002801 A | 1/1996 |
| JP | 9-044051 A | 2/1997 |
| JP | 11-292376 A | 10/1999 |
| JP | 2004-045963 A | 2/2004 |
| JP | 2004-205571 A | 7/2004 |
| JP | 2005-031306 A | 2/2005 |
| JP | 2005-341145 A | 12/2005 |
| JP | 2006-208475 A | 8/2006 |
| JP | 2009-091065 A | 4/2009 |

* cited by examiner

FIG.14

SELECT TYPE OF SHEET PROCESSING
(SHEET PROCESSING ONLY)...

PLEASE SELECT TYPE OF SHEET PROCESSING
TO BE EXECUTED ON JOB TO BE PROCESSED.

| STAPLING | PUNCHING | CUTTING |

| SADDLE STITCH BINDING | FOLDING |

GLUING BINDING (1)
(CASE BINDING)

GLUING BINDING (2)
(TOP GLUING BINDING)

INSERTION
PROCESSING

CANCEL  OK

1401

PRINTING SYSTEM, METHOD FOR CONTROLLING THE PRINTING SYSTEM, AND PROGRAM

BACKGROUND OF THE INVENTION

1. Field of the Invention

The present invention relates to a printing system, a method for controlling the printing system, and a program.

2. Description of the Related Art

U.S. Patent Application Publication No. 2004/0190057 discusses a print on demand (POD) printing system that utilizes an electrophotographic type printing apparatus or an inkjet type printing apparatus. By utilizing the POD printing system, it becomes unnecessary to prepare a block copy or execute complicated operations.

In the POD printing system, however, post-processing by a post-processing apparatus (e.g., an inline finisher), by which a sheet can be fed from a printing apparatus and conveyed via a conveyance path, cannot be utilized independently from printing by the printing apparatus. Accordingly, the POD printing system cannot solve further problems to be solved, which may arise when post-processing by an inline finisher is available independently from printing by a printing apparatus provided in the POD printing system.

Now, the further problems of the POD system will be described. Hereinbelow, a job for executing post-processing by a post-processing apparatus after printing by a printing apparatus is defined as an "inline job", while a job for executing post-processing by a post-processing apparatus without executing printing by a printing apparatus is defined as an "offline job".

More specifically, if a plurality of post-processing apparatuses is connected to the printing apparatus, the installation location of the post-processing apparatus may be remote from that of the printing apparatus. In this case, it is necessary for the user to come up to the remotely located post-processing apparatus and set a sheet in the paper feed unit of an inserter after executing a print setting via an operation unit of the printing apparatus.

In addition, it is also necessary for the user to return to the printing apparatus to press a start key provided in the operation unit of the printing apparatus.

As described above, in the conventional method, it is necessary for the user to move between the printing apparatus and the post-processing apparatus. Accordingly, it becomes necessary for the user to execute complicated operations.

SUMMARY OF THE INVENTION

According to an aspect of the present invention, a printing system includes a job execution unit configured to selectively execute an inline job and an offline job. The inline job is for executing post-processing on a sheet printed by a printing apparatus by using a post-processing apparatus and the offline job for executing post-processing on a sheet without executing printing by the printing apparatus by using the post-processing apparatus. The printing system also includes a detection unit configured to detect that a sheet has been set in a paper feed unit. The paper feed unit is configured to feed a sheet to the post-processing apparatus. The printing system further includes a setting unit configured to set whether to cause the job execution unit to execute an offline job that uses the sheet if the detection unit detects that the sheet has been set in the paper feed unit. The printing system also includes a control unit configured to control the post-processing apparatus to automatically start post-processing corresponding to the offline job in a case where both the control unit is set by the setting unit to cause the job execution unit to execute the offline job and if the detection unit detects that the sheet has been set in the paper feed unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 14 illustrates an example of a UI displayed on the touch panel portion.

DESCRIPTION OF THE EMBODIMENTS

Various exemplary embodiments, features, and aspects of the invention will be described in detail below with reference to the drawings.

Figure 1:
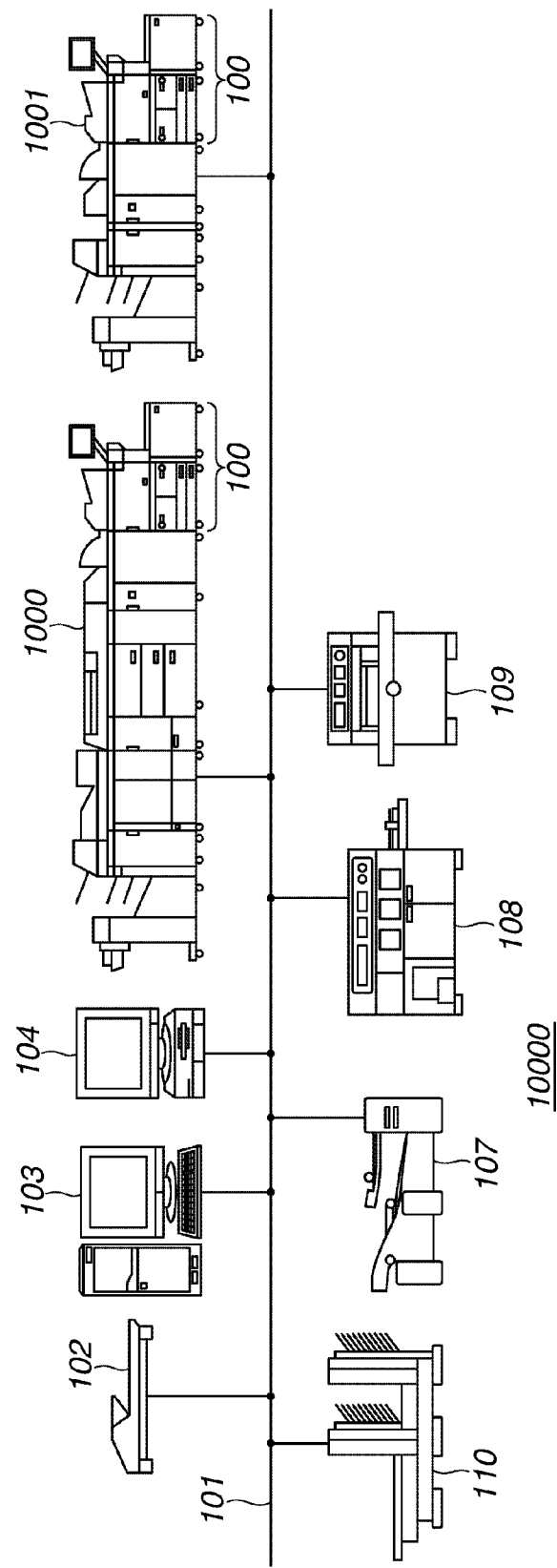
FIG. 1 illustrates an exemplary configuration of the entire printing environment including a printing system according to an exemplary embodiment of the present invention.

FIG. 1 illustrates an exemplary configuration of the entire printing environment 10000, which includes printing systems 1000 and 1001, according to a first exemplary embodiment of the present invention.

Referring to FIG. 1, the printing environment 10000 includes the printing systems 1000 and 1001, a personal computer (PC) (server computer) 103, and a client computer (PC) 104. In addition, the printing environment 10000 includes a paper folding machine 107, a cutting machine 109, a saddle stitch binding machine 110, a case binding machine 108, and a network scanner 102. The above-described component devices of the printing environment 10000 except the saddle stitch binding machine 110 are in communication with one another via a network 101.

Figure 2:
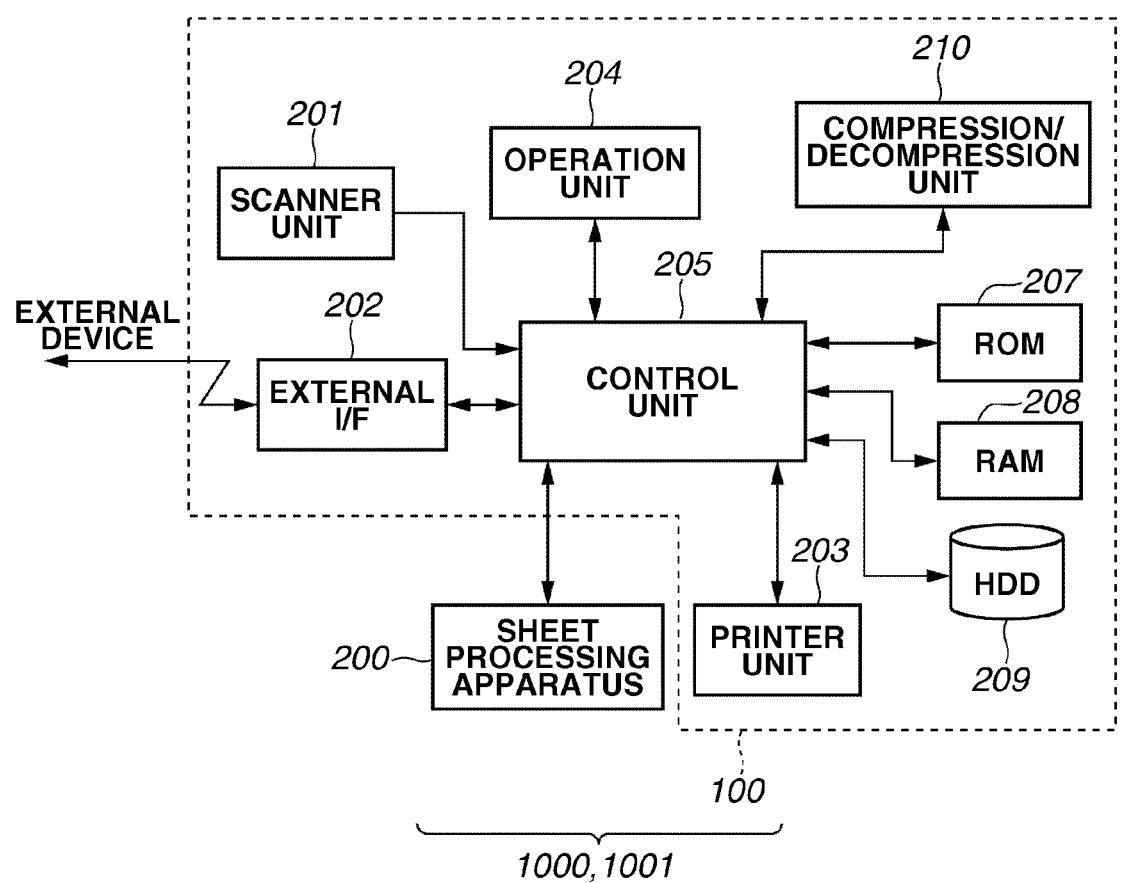
FIG. 2 is a block diagram illustrating an exemplary configuration of the printing system illustrated in FIG. 1.

Each of the printing systems 1000 and 1001 includes a printing apparatus 100 and a sheet processing apparatus 200 (see FIG. 2). In the present exemplary embodiment, a multifunction peripheral (MFP) having a plurality of functions, such as a copy function and a printer function, will be described as an example of the printing apparatus 100. The printing apparatus 100 can be a single function peripheral (SFP)) type printing apparatus including a copy function only or a printer function only.

The server PC 103 manages sending and receiving of data among various apparatuses in communication with one another via the network 101. The client PC 104 sends image data to the printing apparatus 100 or the server PC 103 via the network 101. The paper folding machine 107 folds paper sheets printed with the printing apparatus 100. The case binding machine 108 performs case binding processing of sheets printed with the printing apparatus 100. The cutting machine 109 cuts a stack of sheets printed with the printing apparatus 100. The saddle stitch binding machine 110 performs saddle stitch binding processing on sheets printed with the printing apparatus 100.

In utilizing the paper folding machine 107, the case binding machine 108, the cutting machine 109, and the saddle stitch binding machine 110, a user (operator) takes out sheets printed with the printing apparatus 100 from the printing system 1000 or 1001 and then sets the printed sheets into the machine that the user desires to use to perform desired processing. In the present exemplary embodiment, the printing system 1001 has the same configuration as that of the printing system 1000. However, the present exemplary embodiment is not limited to this.

An exemplary configuration of each of the printing systems 1000 and 1001 will now be described below with reference to a system block diagram illustrated in FIG. 2. FIG. 2 is a block diagram illustrating an exemplary configuration of each of the printing systems 1000 and 1001 illustrated in FIG. 1.

A unit may be viewed as an assemblage of components that is regarded as a single entity. Other than the sheet processing apparatus 200, units included in the printing systems 1000 and 1001 illustrated in FIG. 2 are included in the printing apparatus 100. An arbitrary number of sheet processing apparatuses 200 can be connected to the printing apparatus 100.

The printing system 1000 and 1001 can perform sheet processing ("sheet processing" will hereafter be also referred to as "post-processing") of sheets printed with the printing apparatus 100, via the sheet processing apparatus 200, which is connected to the printing apparatus 100.

The sheet processing apparatus 200 can communicate with the printing apparatus 100. The sheet processing apparatus 200 receives an instruction from the printing apparatus 100 to perform sheet processing to be described below.

A scanner unit 201 reads an image of an original document, converts the read document image into image data, and transfers the converted image data to another unit. An external interface (I/F) unit 202 sends and receives data to and from another apparatus that is in communication with the external I/F unit 202 via the network 101.

A printer unit 203 prints an image on a sheet based on input image data. An operation unit 204 includes a key input portion 4002 (FIG. 7) and a touch panel portion 4001 (FIG. 7) and receives an instruction from the user via the key input portion 4002 and the touch panel portion 4001. The operation unit 204 provides various displays on the touch panel portion 4001.

A control unit 205 controls processing and operations of the various units included in the printing systems 1000 and 1001. That is, the control unit 205 controls the operations of the printing apparatus 100 and the sheet processing apparatus 200 connected to the printing apparatus 100.

A read-only memory (ROM) 207 stores various computer programs to be executed by the control unit 205. For example, the ROM 207 stores a program used for executing various processing illustrated in flow charts to be described below by the control unit 205 and a display control program used for displaying various setting screens to be described below.

In addition, the ROM 207 stores a program used to allow the control unit 205 to interpret page description language (PDL) code data received from the server PC 103 or the client PC 104 and to rasterize the interpreted data into raster image data. Furthermore, the ROM 207 stores various programs, such as a boot sequence, and font information.

A random access memory (RAM) 208 stores image data sent from the scanner unit 201 or the external I/F unit 202 and various programs and setting information stored in the ROM 207. Furthermore, the RAM 208 stores information related to the sheet processing apparatus 200 (information on the number of sheet processing apparatuses 200 connected to the printing apparatus 100 (from 0 to n), information on functions of each of the sheet processing apparatuses 200, and information on a connection order of the sheet processing apparatuses 200).

A hard disk drive (HDD) 209 includes a hard disk and a drive unit used for reading and writing data from and onto the hard disk. The HDD 209 is a large-capacity storage device storing image data input from the scanner unit 201 or the external I/F unit 202 and compressed by a compression/decompression unit 210.

The control unit 205 can perform printing of the image data stored in the HDD 209 with the printer unit 203 according to an instruction from the user. Moreover, the control unit 205 can send image data stored in the HDD 209 to an external apparatus, such as the server PC 103, the printing system 1000, or the printing system 1001, via the external I/F unit 202 according to an instruction from the user.

In addition, the control unit 205 can receive image data from an external apparatus, such as the server PC 103, the printing system 1000, or the printing system 1001, via the external I/F unit 202. Furthermore, the control unit 205 can search for an external apparatus connected to the network 101 via the external I/F unit 202.

The compression/decompression unit 210 performs an operation for compressing and decompressing image data stored in the RAM 208 or the HDD 209 according to various compression systems, such as Joint Bi-level Image Experts Group (JBIG) and Joint Photographic Experts Group (JPEG).

Figure 3:
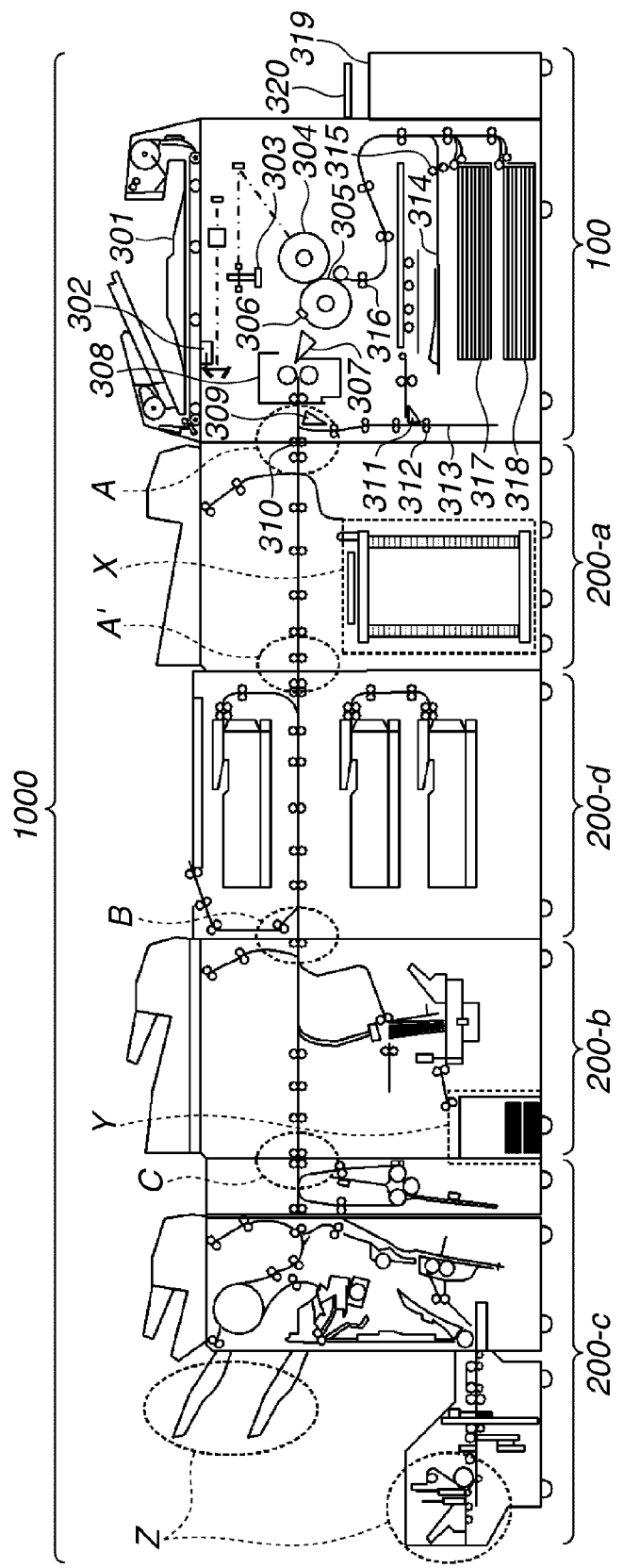
FIG. 3 is a cross section illustrating an exemplary configuration of a sheet processing apparatus, which is connected to the printing apparatus.

An exemplary configuration of the printing system 1000 will now be described with reference to FIG. 3. FIG. 3 is a cross section of the printing apparatus 100 (FIG. 1) and the sheet processing apparatus 200 (FIG. 2), which is connected to the printing apparatus 100.

Referring to FIG. 3, an auto document conveyance apparatus (auto document feeder (ADF)) 301 separates a document placed on top of a document bundle set on a stacking surface of a document tray in a stacking order and conveys the separated document onto a document positioning glass to scan the document with a scanner 302.

The scanner 302 reads an image on the document conveyed onto the document positioning glass and converts the read image into image data with a charge-coupled device (CCD). A ray, such as a laser beam, modulated according to image data is made incident on a rotating polygonal mirror 303. The ray reflected from the polygonal mirror 303 falls on the surface of a photosensitive drum 304 via a reflection mirror as reflection scanning light.

A latent image formed on the surface of the photosensitive drum 304 with the laser beam is developed with a toner. A toner image is transferred onto a sheet attached onto the surface of a transfer drum 305. By serially performing a series of image-forming processes on toners of colors of yellow (Y), magenta (M), cyan (C), and black (K), a full color image is formed. After performing four image-forming processes, a sheet on the transfer drum 305, onto which a full color image has been formed, is separated by a separation claw 306. The separated sheet is conveyed to a fixing device 308 by a pre-fixing conveyance device 307.

The fixing device 308 includes rollers and a belt in combination with one another. The fixing device 308 includes therein a heat source, such as a halogen heater, and resolves and fixes the toner on the sheet, onto which the toner image has been transferred, with heat and pressure. A paper discharge flapper 309 can swing around a swinging axis and regulates the direction of conveying a sheet.

When the paper discharge flapper 309 swings clockwise in FIG. 3, a sheet is conveyed in a straight direction and then is discharged to the outside of the printing apparatus 100 by a discharge roller 310. With a series of processes described above, the control unit 205 controls the printing apparatus 100 so that the printing apparatus 100 performs one-sided printing.

In forming images on both sides of a sheet, the paper discharge flapper 309 swings counterclockwise in FIG. 3. The conveyance direction of the sheet is changed to a downward direction to convey the sheet to a two-sided conveyance unit. The two-sided conveyance unit includes a reversal flapper 311, a reversal roller 312, a reversal guide 313, and a two-sided tray 314.

The reversal flapper 311 swings around a swinging axis and regulates the direction of conveying a sheet. In performing a two-sided print job, the control unit 205 performs control so that the reversal flapper 311 swings counterclockwise in FIG. 3 to convey a sheet, whose first side already is printed with the printer unit 203, into the reversal guide 313 via the reversal roller 312. The control unit 205 temporarily stops the reversal roller 312 in the state where a trailing edge of the sheet is pinched by the reversal roller 312, and then allows the reversal flapper 311 to swing clockwise in FIG. 3. Further, the control unit 205 allows the reversal roller 312 to rotate in a reverse direction.

Thus, the sheet is switched back to be conveyed. The control unit 205 performs control to guide the sheet to the two-sided tray 314 in the state where the leading edge and the trailing edge of the sheet have been changed in position. The sheet is temporarily stacked on the two-sided tray 314. The sheet is then conveyed to a registration roller 316 by a refeed roller 315.

At this time, the sheet is fed with a side thereof opposite to the first side used in the transfer processing facing the photosensitive drum 304. Then, the control unit 205 performs control to form an image on the second side of the sheet as in the processing described above. Thus, images are formed on both sides of the sheet. After fixing processing is completed, the sheet is discharged to the outside of the printing apparatus 100 via the discharge roller 310.

By serially performing the processes described above, the control unit 205 controls the printing apparatus 100 to perform two-sided printing.

In addition, the printing apparatus 100 includes a paper feed unit for storing sheets used for print processing. The paper feed unit includes paper feed cassettes 317 and 318, each of which can store, for example, five hundred sheets, a paper feed deck 319, which can store, for example, five thousand sheets, and a manual feed tray 320.

Various sheets of different sizes and materials can be respectively set in the paper feed cassettes 317 and 318 and the paper feed deck 319. In the manual feed tray 320, various types of sheets including a special sheet, such as an overhead projector (OHP) sheet, can be set. Each of the paper feed cassettes 317 and 318, the paper feed deck 319, and the manual feed tray 320 includes a paper feed roller. Sheets can be serially fed one by one by the paper feed roller.

The sheet processing apparatus 200 illustrated in FIG. 3 will now be described.

An arbitrary number of different types of sheet processing apparatuses 200 in the printing systems 1000 according to the present exemplary embodiment can be connected in tandem as long as sheets can be conveyed from the sheet processing apparatus 200 on the upstream side to the sheet processing apparatus 200 on the downstream side via a sheet conveyance path.

The control unit 205 receives a request for performing sheet processing desired by the user of a plurality of types of sheet processing options that can be performed by the sheet processing apparatus 200 connected to the printing apparatus 100, together with a request for performing printing, via the operation unit 204. When the control unit 205 receives the request for performing printing of a job to be processed from the user via the operation unit 204, the control unit 205 performs the print processing requested for the job with the printer unit 203.

The control unit 205 allows the sheet on which the print processing has been performed to be conveyed to the sheet processing apparatus 200 that can perform the sheet processing desired by the user via the sheet conveyance path and to perform the sheet processing with the sheet processing apparatus 200.

For example, the control unit 205 of the printing system 1000 executes control of a mass stacker 200-*a* for executing mass stacking processing. In addition, the control unit 205 also executes control of a gluing binding machine 200-*b* to execute top gluing binding processing or case binding processing. Furthermore, the control unit 205 executes control of a saddle stitch binding machine 200-*c* for executing saddle stitch binding processing.

Moreover, suppose that the job to be processed, whose user request for executing printing in the above-described configuration of the printing system has been received, is a job in which sheet processing by an inserter 200-*d* has been designated to be executed. In this case, the job is referred to as an "inserter paper feed job" in the present exemplary embodiment.

Now, processing executed on an inserter paper feed job in the printing system having the configuration illustrated in FIG. 3 will be described in detail below.

In the present exemplary embodiment, the inserter 200-*d* functions as a printed product feed source for feeding a printed product to a downstream post-processing apparatus. In addition, the inserter 200-*d* includes a sensor for determining whether a printed product has been set on the printed product feed source. A result of the determination is notified to the control unit 205.

The control unit 205 inserts a sheet fed from the inserter 200-*d* into the sheets of the job printed by the printing apparatus 100. In addition, the control unit 205 conveys the sheet to the sheet processing apparatus 200 according to the designated sheet processing to execute the sheet processing thereon.

In the example of the printing system 1000 illustrated in FIG. 3, the gluing bookbinding machine 200-*b* and the saddle stitch binding machine 200-*c* are provided downstream of the inserter 200-*d*. With this configuration, a gluing bookbinding job and a saddle stitch binding job can be executed within the printing system 1000.

In executing an inserter paper feed job, it is not always necessary to execute printing by the printing apparatus 100. More specifically, the sheet processing can be executed by conveying a sheet fed from the inserter 200-*d* to a downstream sheet processing apparatus 200, which has been designated by the user, to execute sheet processing thereon.

Figure 4:
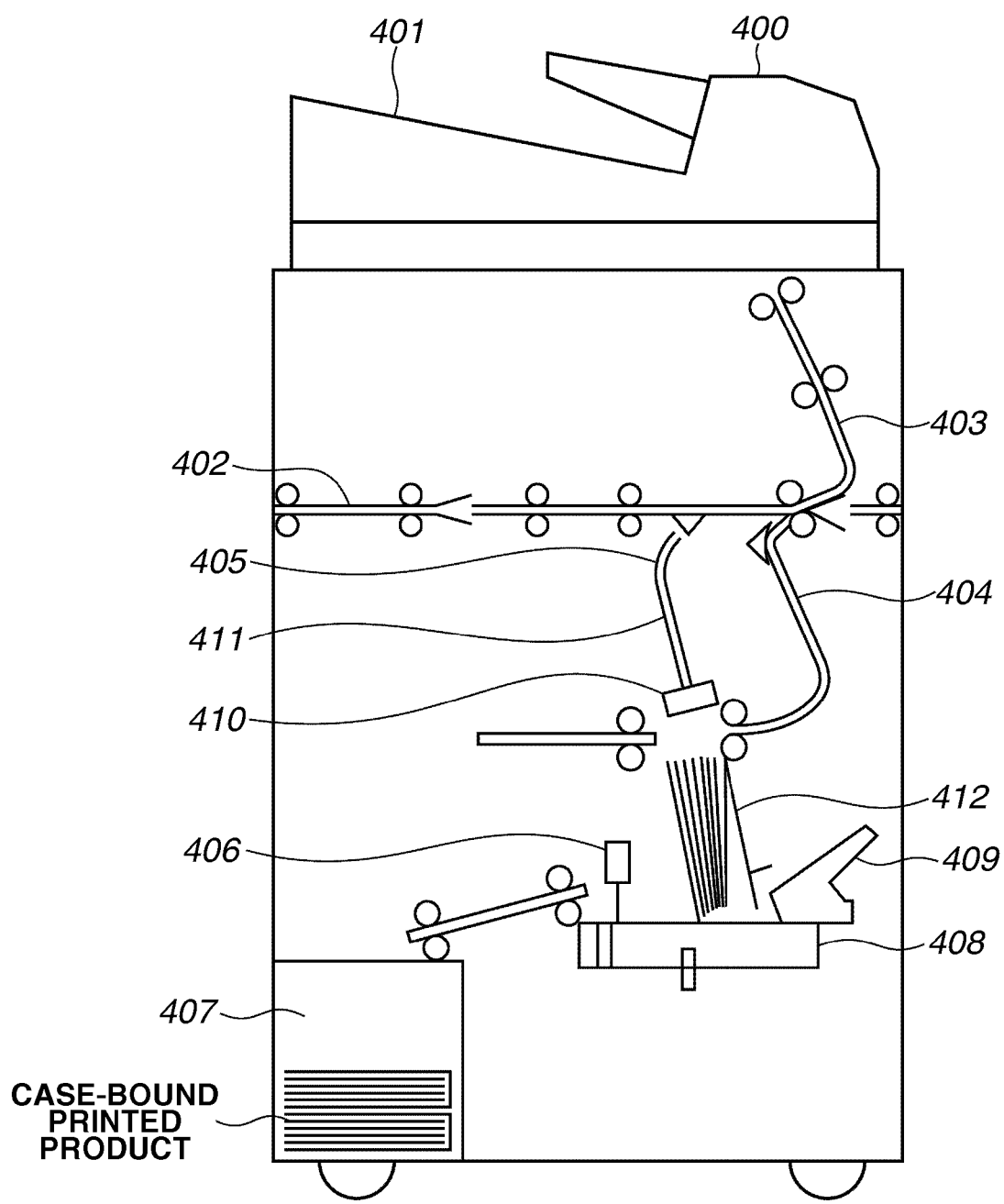
FIG. 4 is a cross section illustrating an exemplary configuration of a gluing bookbinding machine.

An exemplary inner configuration of each type of sheet processing apparatus 200, which can be connected to the printing apparatus 100, will be described in detail below with reference to each of FIGS. 4, 5, and 8. FIG. 4 is a cross section illustrating an exemplary configuration of the gluing bookbinding machine 200-*b* illustrated in FIG. 3.

The gluing bookbinding machine 200-*b* conveys a sheet conveyed from an upstream apparatus selectively into three conveyance paths. The conveyance paths include a cover path 404, a textblock path 405, and a straight path 402.

In addition, the gluing bookbinding machine 200-*b* includes an inserter path 403. The inserter path 403 of an inserter 400 is a sheet conveyance path used for conveying a sheet placed on an inserter tray 401 to the cover path 404.

The straight path 402 (FIG. 4) of the gluing bookbinding machine 200-*b* is a sheet conveyance path used for conveying a sheet used in a job that requires no gluing bookbinding processing with the gluing bookbinding machine 200-*b* to a later stage apparatus.

The textblock path 405 and the cover path 404 of the gluing bookbinding machine 200-*b* are sheet conveyance paths used for conveying a sheet necessary for generating a case-bound printed product.

For example, in generating a case-bound printed product using the gluing bookbinding machine 200-*b*, the control unit 205 prints image data for the text that is to be printed on a sheet for the text of the case-bound printed product with the printer unit 203. In generating one case-bound printed product, a sheet stack for one book including sheets for the text is wrapped with one cover sheet. The sheet stack for the text used in case binding is herein referred to as a "textblock". Hereinbelow, a "textblock" may also be referred to as merely a "text".

The control unit 205 performs control so that the sheets for the textblock printed with the printing apparatus 100 are conveyed to the textblock path 405 illustrated in FIG. 4.

The control unit 205, in performing case binding processing, performs processing for binding the textblock sheets printed with the printing apparatus 100 with the cover sheet conveyed via the cover path 404.

For example, the control unit 205 allows the textblock sheets conveyed from an upstream apparatus to be serially stacked in a stacking unit 411 via the textblock path 405. When the sheets onto which the text data is printed are stacked in the stacking unit 411 in an amount equivalent to the number of sheets for one book, the control unit 205 allows one sheet used for the cover required in the job to be conveyed via the cover path 404.

The control unit 205 (FIG. 2) controls a gluing unit 410 (FIG. 4) so that the gluing unit 410 performs gluing processing on a spine portion of one set of the sheet stack that is equivalent to the textblock. After that, the control unit 205 controls the gluing unit 410 so that the gluing unit 410 attaches the spine portion of the textblock to a central portion of the cover sheet. In attaching the textblock to the cover, the textblock is conveyed while being pressed into a lower portion of the gluing bookbinding machine 200-*b*.

Thus, the control unit 205 performs processing for folding the cover sheet to wrap the textblock with one cover sheet. Subsequently, one set of sheet stack is stacked on a turntable 408 (FIG. 4) along a guide 412 (FIG. 4).

After one set of sheet stack is set on the turntable 408, the control unit 205 performs processing for cutting the sheet stack with a cutter unit 406 (FIG. 4). In performing the cutting processing, three-side trimming processing, in which three sides except for the edge corresponding to the spine portion of one set of the sheet stack are cut, is performed with the cutter unit 406.

Subsequently, the control unit 205 presses the sheet stack that has been trimmed in three sides toward a basket 407 using a narrowing portion 409 to store the sheet stack in the basket 407.

The present exemplary embodiment generates a book by case binding in the above-described manner. In the present exemplary embodiment, the gluing bookbinding machine 200-*b* can selectively execute "top gluing binding" processing instead of case binding. More specifically, "top gluing binding" is processing for binding a sheet stack into a book without providing a cover as in case binding. To paraphrase this, in top gluing binding, a side edge of a textblock (text) is glued.

Furthermore, the gluing bookbinding machine 200-*b* can not only process the sheet conveyed from an upstream apparatus but also execute case binding processing or top gluing binding processing on a sheet fed from the paper feed unit of the gluing bookbinding machine 200-*b* itself.

An operation for generating a case-bound printed product by one sheet processing apparatus 200 only will be described in detail below. More specifically, an operator sets a sheet to be processed on the inserter tray 401 (FIG. 4). Then, the control unit 205 executes control for feeding the sheet set on the inserter tray 401 by using the inserter 400 (FIG. 4). The sheet is used as a textblock.

Furthermore, the control unit 205 executes control for conveying the sheet used as the textblock into the textblock path 405 (FIG. 4). Furthermore, the control unit 205 executes control for conveying the cover sheet, which has been fed from the inserter tray 401, via the cover path 404. Moreover, the control unit 205 executes processing for case-binding the textblock sheets. The processing to be executed thereafter is as described above.

The gluing bookbinding machine 200-*b* includes a sensor for determining whether a sheet has been set on the inserter tray 401 of the inserter 400. The gluing bookbinding machine 200-*b* transmits a result of the determination of presence of a sheet by the sensor to the control unit 205 via a signal line (not illustrated). Accordingly, the control unit 205 can determine whether a sheet has been set on the inserter tray 401.

An exemplary inner configuration of the saddle stitch binding machine 200-*c* will now be described below with reference to FIG. 5.

Figure 5:
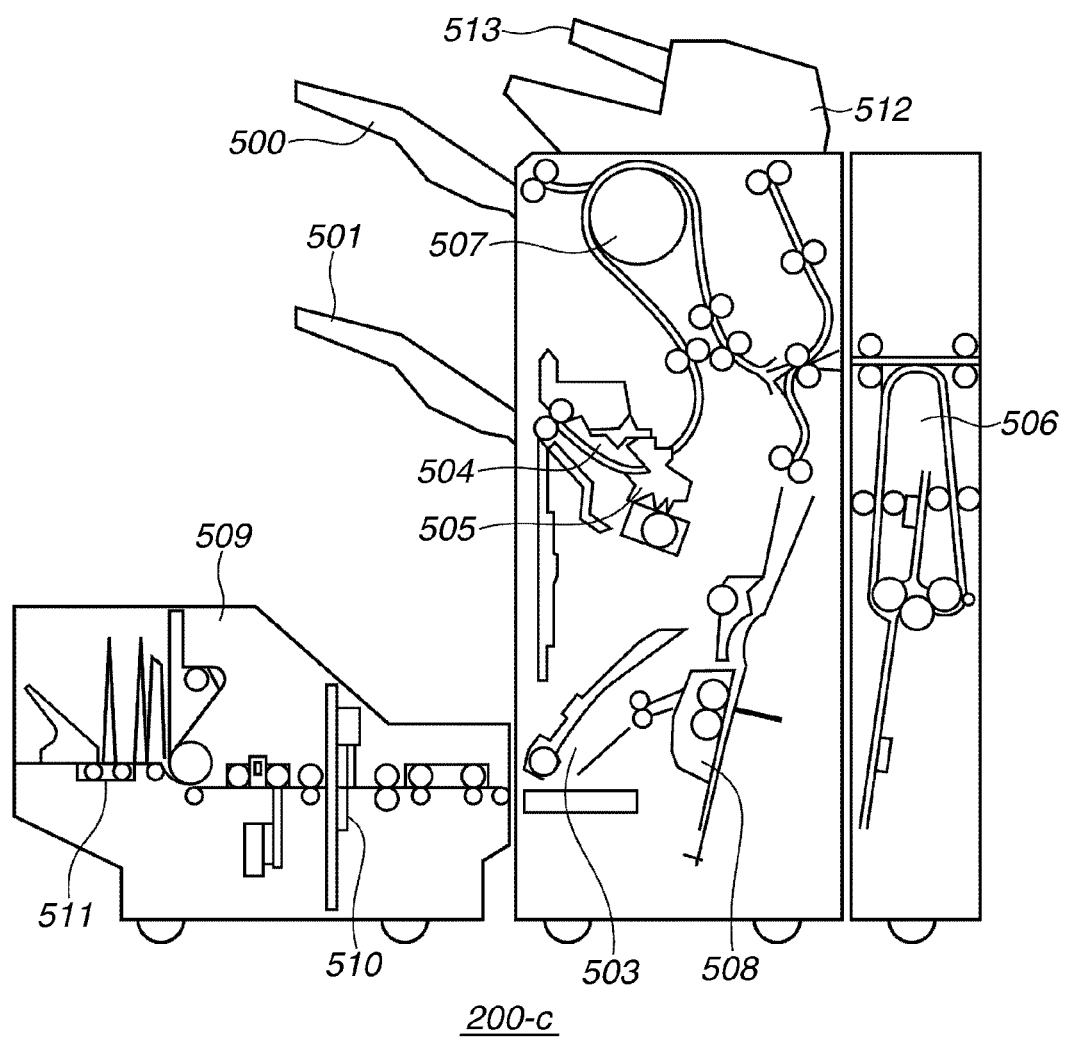
FIG. 5 is a cross section illustrating an exemplary configuration of a saddle stitch binding machine.

Referring to FIG. 5, the saddle stitch binding machine 200-*c* includes various units provided for selectively performing stapling processing, cutting processing, punching processing, Z-folding processing (also referred to as "one-edge folding processing"), shift discharge processing, and saddle stitch binding processing on sheets fed from the printing apparatus 100.

Furthermore, the saddle stitch binding machine 200-*c* does not include a straight path that functions as a sheet conveyance path to a downstream apparatus. Accordingly, in connecting a plurality of sheet processing apparatuses 200 to the printing apparatus 100, the saddle stitch binding machine 200-*c* is connected as the last apparatus, as illustrated in FIG. 3.

In addition, the saddle stitch binding machine 200-*c* includes a sample tray 500 and a stack tray 501 outside the saddle stitch binding machine 200-*c* and a booklet tray 503 inside the saddle stitch binding machine 200-*c*, as illustrated in FIG. 5.

When the control unit 205 receives an instruction for stapling with the saddle stitch binding machine 200-*c*, the control unit 205 allows sheets printed with the printing apparatus 100 to be serially stacked into a processing tray 504 inside the saddle stitch binding machine 200-*c*. After the sheets for one sheet stack are stacked on the processing tray 504, the control unit 205 performs stapling with a stapler 505. Then, the control unit 205 discharges the stapled sheet stack from the processing tray 504 to the stack tray 501 (FIG. 5).

In performing a job in which Z-folding is instructed to be performed with the saddle stitch binding machine 200-*c*, the control unit 205 performs processing for folding the sheet printed with the printing apparatus 100 in a Z-like shape with a Z-folding unit 506. Then, the control unit 205 allows the folded sheet to pass through the saddle stitch binding machine 200-*c* and to be discharged onto a discharge tray, such as the stack tray 501 or the sample tray 500.

When the control unit 205 is instructed to perform punching processing with the saddle stitch binding machine 200-*c*, the control unit 205 performs punching processing on the sheet printed with the printing apparatus 100 with a puncher unit 507. Then, the control unit 205 allows the sheet to pass through the saddle stitch binding machine 200-*c* and to be discharged onto a discharge tray, such as the stack tray 501 or the sample tray 500.

In performing a job in which saddle stitch binding is instructed to be performed with the saddle stitch binding machine 200-*c*, the control unit 205 performs binding at two positions in a central portion of the sheet stack including a plurality of sheets for one set with a saddle stitcher unit 508. After that, the control unit 205 performs two-folding using the central portion of the sheet stack as a reference by engaging the central portion of the sheet stack with a roller.

Thus, a leaflet-like booklet can be produced. The sheet stack on which the saddle stitch binding processing has been performed with the saddle stitcher unit 508 is conveyed to the booklet tray 503.

In addition, the control unit 205 executes cutting processing by using a cutter unit 510 of a trimmer 509 according to a setting by the user.

Furthermore, the saddle stitch binding machine 200-*c* can add a sheet set on an inserter tray 513 of an inserter 512 (FIG. 5) (for example, a previously printed cover sheet) to the sheet printed with and conveyed from the printing apparatus 100.

In addition, the saddle stitch binding machine 200-*c* not only processes the sheet conveyed from an upstream apparatus but also executes stapling, cutting, punching, Z-folding, shift discharge processing, and saddle stitch binding on the sheet fed from the paper feed unit of the saddle stitch binding machine 200-*c*. However, in the example illustrated in FIG. 5, the saddle stitch binding machine 200-*c* does not have a path for conveying the sheet fed by using the inserter 512 into the Z-folding unit 506.

Accordingly, Z-folding processing cannot be implemented by using the saddle stitch binding machine 200-*c* only. However, the saddle stitch binding machine 200-*c* can convey the sheet conveyed from an upstream apparatus to the Z-folding unit 506 (FIG. 5). Therefore, in the present exemplary embodiment, when a sheet is fed from an upstream sheet processing apparatus 200 by using an inserter thereof, the sheet can be processed by the Z-folding unit 506 (FIG. 5). As described above, the present exemplary embodiment can execute sheet processing only without using the printing apparatus 100.

The saddle stitch binding machine 200-*c* includes a sensor for determining whether a sheet has been set on the inserter tray 513 of the inserter 512. The saddle stitch binding machine 200-*c* transmits a result of the determination of presence of a sheet by the sensor to the control unit 205 via a signal line (not illustrated). Accordingly, the control unit 205 can determine whether a sheet has been set on the inserter tray 513.

Figure 6:
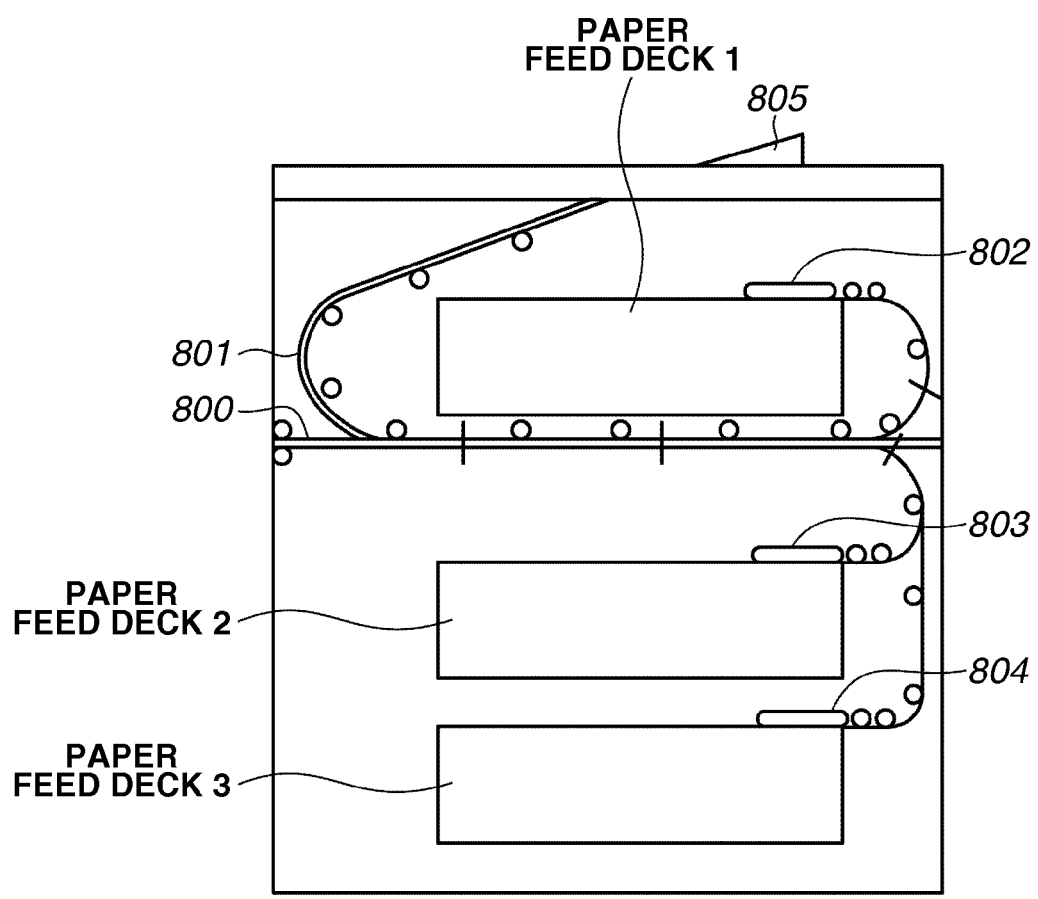
FIG. 6 is a cross section illustrating an exemplary configuration of a mass inserter.

Now, an exemplary configuration of the mass inserter 200-*d*, which can be applied in the sheet processing apparatus 200, will be described in detail below with reference to FIG. 6. FIG. 6 is a cross section illustrating an exemplary configuration of the mass inserter 200-*d*.

Referring to FIG. 6, the mass inserter 200-*d* conveys a sheet conveyed from an upstream sheet processing apparatus 200 to a downstream apparatus via a straight path 800. In addition, the mass inserter 200-*d* feeds a sheet from each paper feed stage (each of paper feed decks 1 through 3 illustrated in FIG. 6) by using a respective one of paper feed motors 802 through 804. Furthermore, the mass inserter 200-*d* conveys the fed sheet to a downstream apparatus via the straight path 800.

Furthermore, each of paper feed decks 1 through 3 includes a sensor for determining whether a sheet is present therein. Each of paper feed decks 1 through 3 notifies a result of the determination to the control unit 205. Thus, the control unit 205 can determine whether a sheet is set in each paper feed stage (the paper feed decks 1 through 3). An escape path 801 is a sheet conveyance path for discharging a sheet onto an escape tray 805.

An exemplary configuration of the operation unit 204 will now be described below with reference to FIG. 7.

Figure 7:
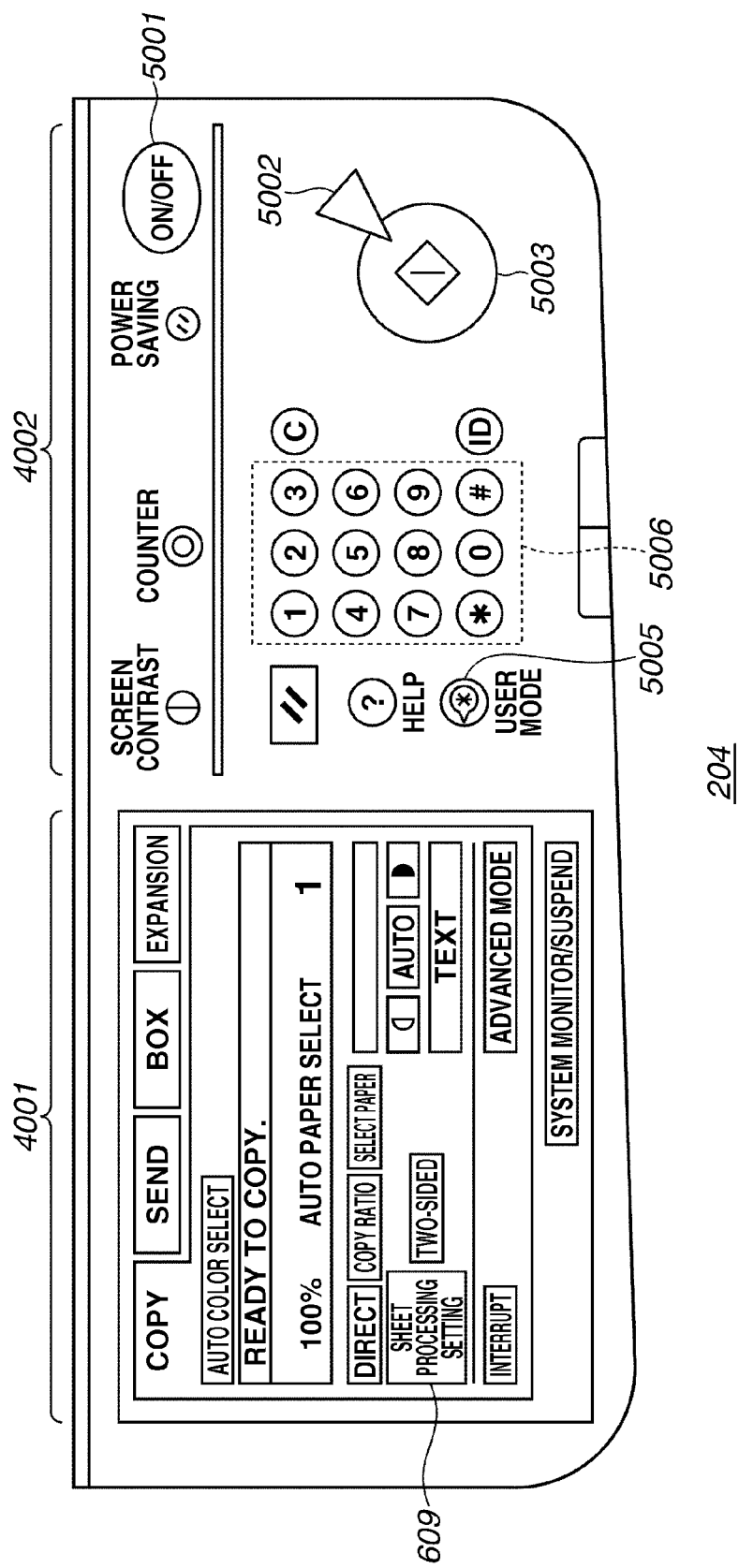
FIG. 7 illustrates an exemplary configuration of an operation unit.

Referring to FIG. 7, the operation unit 204 includes a touch panel portion 4001 and a key input portion 4002. The touch panel portion 4001 includes a liquid crystal display (LCD) and a transparent electrode attached on the LCD, and displays various setting screens used for receiving an instruction from the user. The touch panel portion 4001 not only functions to display various setting screens but also functions to receive an instruction from the user.

The key input portion 4002 includes a power key 5001, a start key 5003, a stop key 5002, a user mode key 5005, and a numeric keypad 5006. The start key 5003 is used for starting a copy job or a sending job with the printing apparatus 100.

The numeric keypad 5006 is used in performing a setting for entering numerical values, such as the number of copies to print. The user mode key 5005 is used for executing various settings for the apparatus.

The control unit 205 controls the printing system 1000 so that the printing system 1000 performs various types of processing according to a user instruction received via various screens displayed on the touch panel portion 4001 and a user instruction received via the key input portion 4002.

With the above-described configuration, the printing apparatus 100 executes an inline job, in which the sheet processing apparatus 200 executes post-processing on the sheet printed by the printing apparatus 100, according to an instruction from the user. Furthermore, the printing apparatus 100 having the above-described configuration executes an offline job, in which the sheet processing apparatus 200 executes post-processing on a sheet without executing printing on the printing apparatus 100, according to an instruction from the user.

The user (operator) can previously set an operation the user desires to execute during various processing, such as print processing or post-processing (sheet processing). Now, each of user interfaces displayed on the touch panel portion 4001 will be described in detail below with reference to FIGS. 8 through 12.

FIGS. 8 through 12 each illustrate an example of a user interface displayed on the touch panel portion 4001 illustrated in FIG. 7. Each of the UIs is an example of a screen that displays a setting of common specifications.

Figure 8:
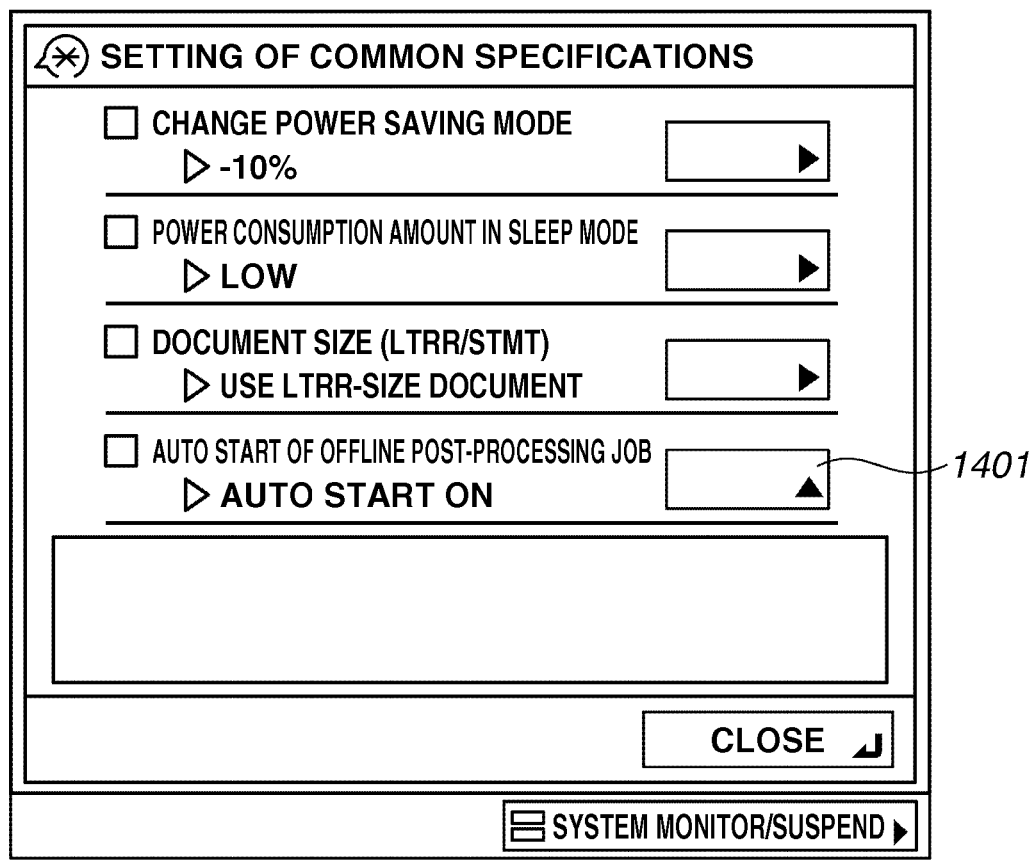
FIG. 8 illustrates an example of a user interface (UI) displayed on a touch panel portion.

The screen illustrated in FIG. 8 is a setting screen via which the user can register setting information about printing and post-processing. The control unit 205 executes control for displaying the screen illustrated in FIG. 8 on the touch panel portion 4001 when the user has pressed the user mode key 5005.

In the example illustrated in FIG. 8, a setting "auto start ON" has been set for a setting item "auto start of offline post-processing job". When the operator presses a key 1401 in this state, the control unit 205 executes control for displaying a screen for changing the setting for the item "auto start of offline post-processing job" (e.g., the screen illustrated in FIG. 9) on the touch panel portion 4001.

Figure 9:
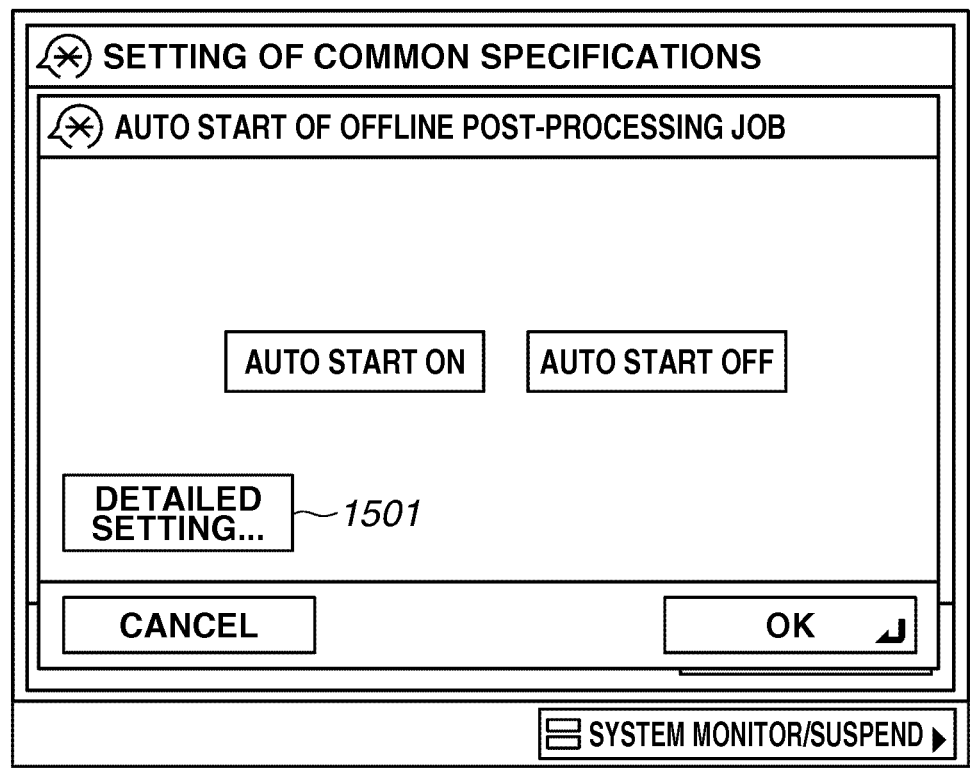
FIG. 9 illustrates an example of a UI displayed on the touch panel portion.

The screen illustrated in FIG. 9 is a setting screen via which the user can register setting information for the auto start mode. In the present exemplary embodiment, the "auto start mode" refers to an operation mode for automatically starting post-processing when a sheet is set in a specific paper feed unit utilized in a job to be processed.

If the auto start mode is selected, it is necessary for the operator to set the sheet in the paper feed unit only and the operator is not required to press the start key 5003 after that.

The control unit 205 executes control so that the screen illustrated in FIG. 9 is displayed on the touch panel portion 4001 when the operator presses the OK key 1401 (FIG. 8). In the example illustrated in FIG. 9, the "auto start ON" key is highlighted, which indicates that the auto start mode has been set.

If the operator presses the "auto start OFF" key in this state, then the setting value is changed to "auto start OFF", which is indicated by highlighting the "auto start OFF" key. By executing the above-described operation, the operator (user) can change the setting for the auto start mode to the "auto start OFF" mode.

In the present exemplary embodiment, if the "auto start ON" is set as the setting value of the auto start mode, whether to actually and automatically start the post-processing is determined according to the setting value ("auto start ON" or "auto start OFF") of each type of the offline post-processing for the job to be processed. The setting value ("auto start ON" or "auto start OFF") of each type of the offline post-processing for the job to be processed will be described in detail below with reference to FIG. 11.

On the other hand, if the setting value "auto start OFF" has been set, the post-processing is not to be automatically started regardless of the type of the offline post-processing to be executed. More specifically, in executing the setting for automatically starting specific offline post-processing, it is necessary for the user to set the setting value "auto start ON" individually for each offline post-processing via a screen illustrated in FIG. 11 after setting the setting value "auto start ON" via the screen illustrated in FIG. 9.

In the example illustrated in FIG. 9, if the "auto start ON" key is highlighted, a detailed setting key 1501 becomes enabled. When the operator presses the detailed setting key 1501, the control unit 205 executes control for displaying a screen illustrated in FIG. 10 on the touch panel portion 4001.

Figure 10:
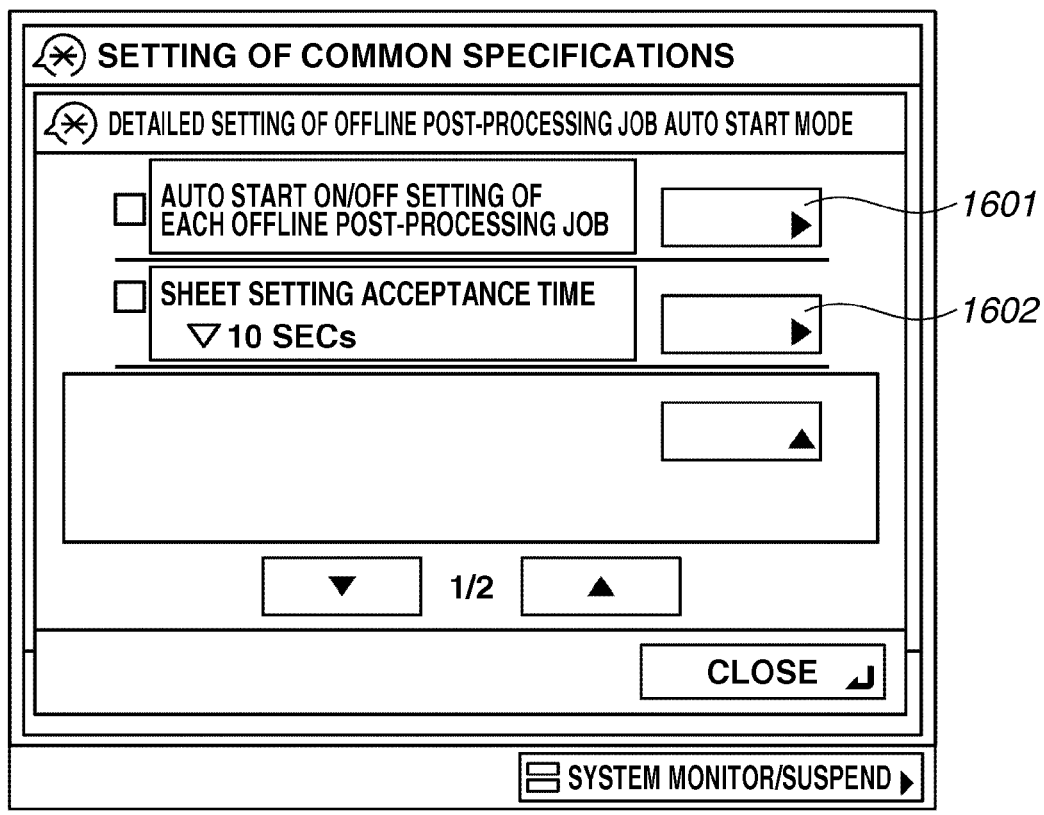
FIG. 10 illustrates an example of a UI displayed on the touch panel portion.

The screen illustrated in FIG. 10 is a setting screen that displays detailed setting items for the offline post-processing job auto start mode. More specifically, in the example illustrated in FIG. 10, the setting screen includes a setting item, such as "auto start ON/OFF setting of each offline post-processing job" or "sheet setting acceptance time".

In verifying or changing the setting of the setting item "auto start ON/OFF setting of each offline post-processing job", the operator can press a key 1601. When the operator presses the key 1601, the control unit 205 executes control for displaying the screen illustrated in FIG. 11 on the touch panel portion 4001.

On the other hand, in verifying or changing the setting of the setting item "sheet setting acceptance time", the operator can press a key 1602. In the example illustrated in FIG. 10, the setting value "10 seconds" is set for the setting item "sheet setting acceptance time".

Figure 11:
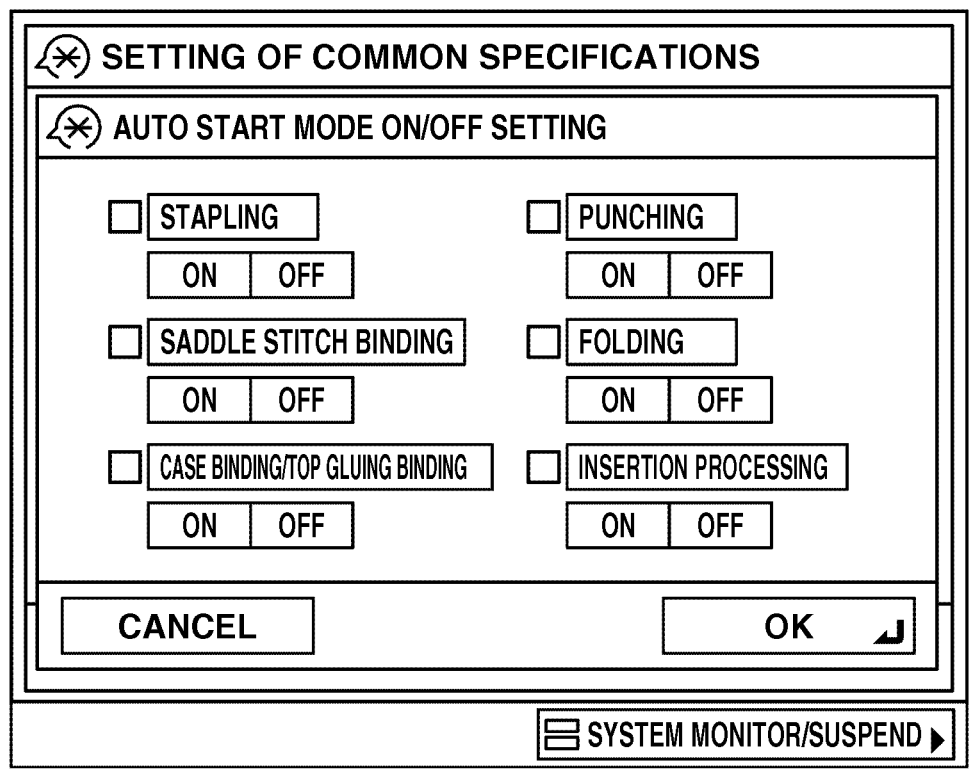
FIG. 11 illustrates an example of a UI displayed on the touch panel portion.

The screen illustrated in FIG. 11 is a setting screen via which the user can register whether each of various offline post-processing is to be automatically started. A setting value "ON" indicates that the corresponding post-processing is to be automatically started while a setting value "OFF" indicates that the corresponding post-processing is not to be automatically started.

In the example illustrated in FIG. 11, stapling, punching, and folding are set to be automatically started, while saddle stitching binding, case binding/top gluing binding, and insertion processing are not set to be automatically started.

Figure 12:
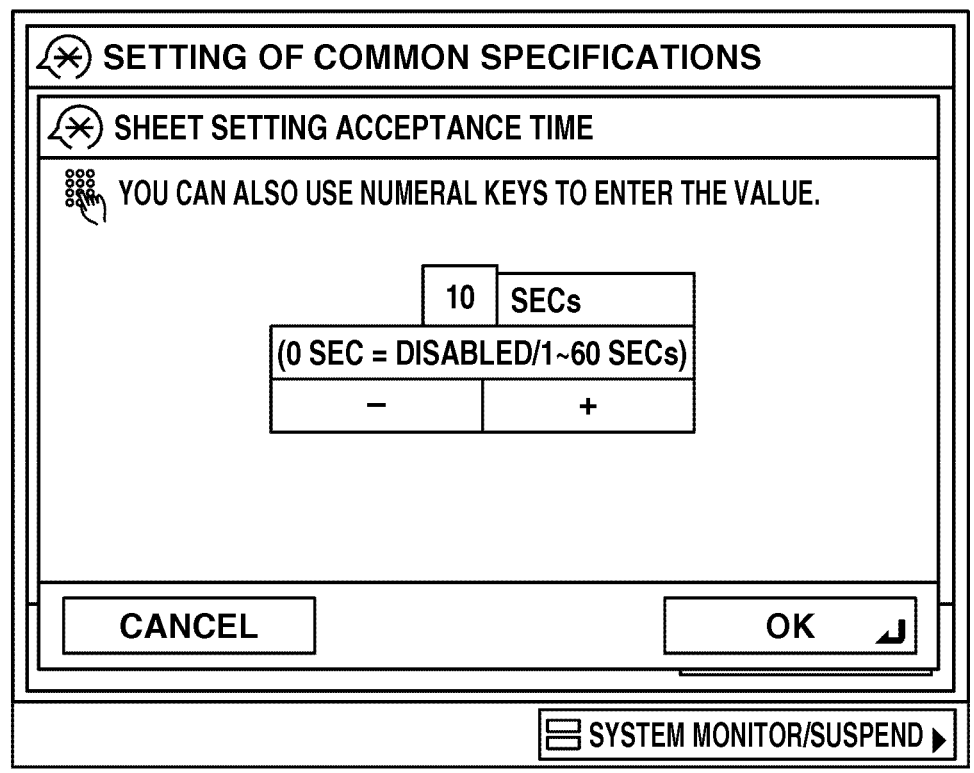
FIG. 12 illustrates an example of a UI displayed on the touch panel portion.

In addition, when the operator (user) presses the key 1602 (FIG. 10), the control unit 205 executes control for displaying the screen illustrated in FIG. 12 on the touch panel portion 4001.

The screen illustrated in FIG. 12 is a setting screen via which the user can register setting information for the setting item "sheet setting acceptance time". In the present exemplary embodiment, the "sheet setting acceptance time" refers to a specific time, whose elapse is a trigger for automatically starting the corresponding post-processing. In other words, after the specific time has elapsed after the sheet is set in the specific paper feed unit utilized in the job to be processed, the corresponding post-processing is automatically started.

More specifically, in the example illustrated in FIG. 12, if it is determined that a time period of 10 seconds or longer has elapsed, which is the setting value that has been set via the screen illustrated in FIG. 12, then the control unit 205 determines that a sheet has been set. In this case, the control unit 205 advances the processing to next processing (i.e., the processing advances from processing in step S1010 to processing in step S1008 illustrated in FIG. 15).

Figure 13:
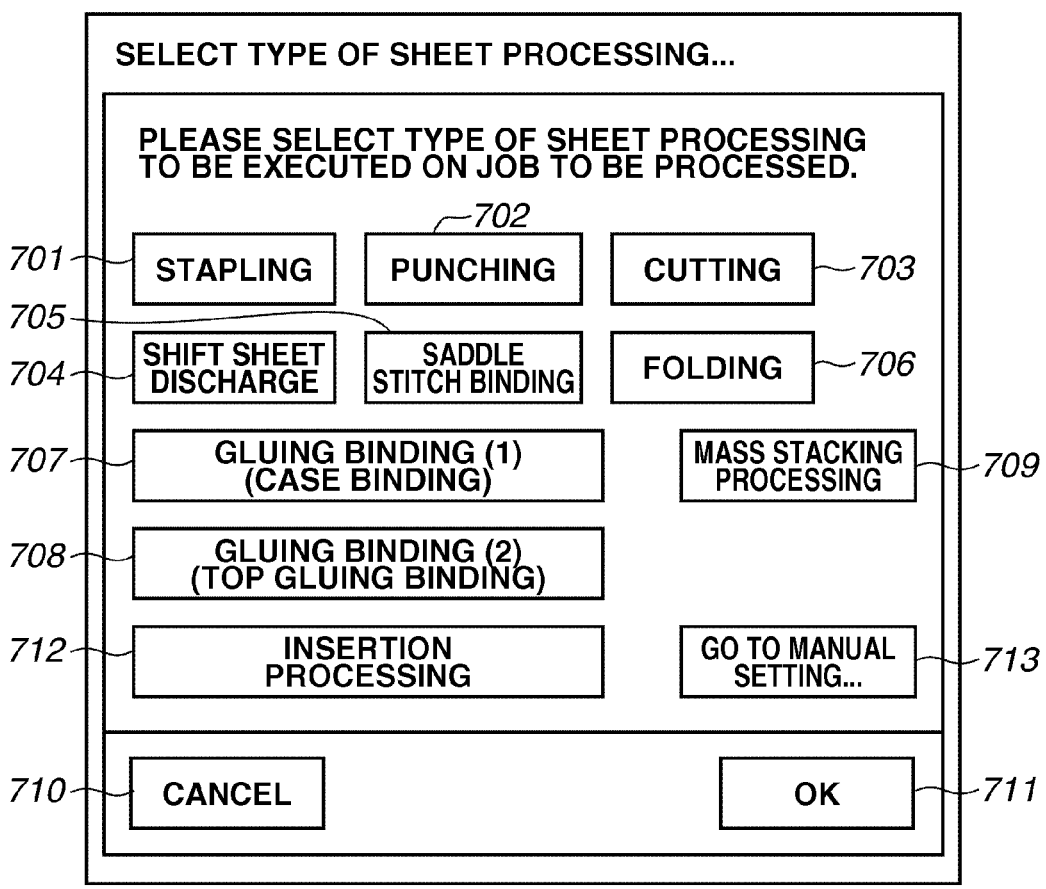
FIG. 13 illustrates an example of a UI displayed on the touch panel portion.

FIG. 13 illustrates an example of a UI (user interface) displayed on the touch panel portion 4001 illustrated in FIG. 7.

The screen illustrated in FIG. 13 is a setting screen via which the user can select the type of the sheet processing to be executed on the sheet printed by the printing apparatus 100 illustrated in FIG. 1.

In the example illustrated in FIG. 13, when the user presses a sheet processing setting key 609, which is displayed on the touch panel portion 4001 illustrated in FIG. 7, the control unit 205 executes control for displaying the screen illustrated in FIG. 13 on the touch panel portion 4001.

The screen illustrated in FIG. 13 is a setting screen via which the user can select the type of the sheet processing that can be executed by using the sheet processing apparatus 200 included in the printing system 1000.

More specifically, via the setting screen illustrated in FIG. 13, the user can execute a setting for performing various types of post-processing, such as stapling processing 701, punching processing 702, cutting processing 703, shift discharge processing 704, saddle stitch binding processing 705, folding processing 706, gluing bookbinding processing 707, gluing bookbinding processing 708, mass stacking processing 709, and insertion processing 712.

In addition, the control unit 205 receives a setting of the sheet processing to be executed in the job to be processed via the setting screen illustrated in FIG. 13. Furthermore, the control unit 205 executes control for performing the sheet processing by using the sheet processing apparatus 200 according to the setting set by the user.

The setting set via the setting screen illustrated in FIG. 13 is enabled when an inline job is executed. The setting can be set by performing the following operations. More specifically, the user sets the type of post-processing for the inline job to be executed via the setting screen illustrated in FIG. 13. The user can execute a setting so that the insertion processing 712 is executed as a setting for an inline job, for example.

The "insertion processing" 712 refers to processing for inserting a sheet fed from the inserter 200-*d* or a sheet fed from the inserter of the gluing bookbinding machine 200-*b* or the saddle stitch binding machine 200-*c* into a location of a stack of sheets printed by the printing apparatus 100.

In executing a setting for performing the insertion processing 712, the user sets the location of insertion of the sheet to be inserted and a paper feed source, which is a source of feeding the sheet to be inserted. The control unit 205 feeds a sheet from the paper feed source set by the user to insert the sheet into the sheet stack at the set location according to the content of the user setting. For the paper feed source, the user can set either one of the paper feed decks 1 through 3 of the inserter 200-*d* or the inserter of the gluing bookbinding machine 200-*b* or the saddle stitch binding machine 200-*c*.

The control unit 205 stores the paper feed source set by the user on the HDD 209. In executing an offline post-processing job, the control unit 205 feeds a sheet from the designated paper feed source and executes post-processing of the designated type on the fed sheet.

The location of inserting a sheet can be set based on the number of sheets to be printed. It is also useful if the location of inserting a sheet is set based on the number of pages of image data to be printed. If the location of inserting a sheet is set based on the number of sheets to be printed, the user sets after which sheet the sheet is to be inserted. On the other hand, if the location of inserting a sheet is set based on the number of pages of the image data to be printed, the user sets after which page the sheet is to be inserted.

Now, a setting screen for executing a setting of an offline job in which sheet processing by the sheet processing apparatus 200 is to be executed without performing printing by the printing apparatus 100 will be described in detail below.

FIG. 14 illustrates an example of a UI displayed on the touch panel portion 4001 illustrated in FIG. 7. The screen illustrated in FIG. 14 is a setting screen via which the user can select the type of post-processing to be executed without performing printing by the printing apparatus 100.

The "post-processing to be executed without performing printing by the printing apparatus 100" refers to processing executed on a sheet fed from the inserter 200-*d* or on a sheet fed from the inserter of the gluing bookbinding machine 200-*b* or the saddle stitch binding machine 200-*c*.

In the example illustrated in FIG. 14, when a "go to manual setting" key 713 included in the screen (FIG. 13), which is displayed on the touch panel portion 4001, is pressed by the user, the control unit 205 executes control for displaying the screen illustrated in FIG. 14 on the touch panel portion 4001.

The screen illustrated in FIG. 14 is a setting screen via which the user can select the type of sheet processing that can be executed as an offline post-processing job by using the sheet processing apparatus 200 included in the printing system 1000 according to the present exemplary embodiment.

More specifically, via the setting screen illustrated in FIG. 14, the user can execute a setting for performing various types of post-processing, such as stapling processing, punching processing, cutting processing, saddle stitch binding processing, folding processing, gluing bookbinding processing (case binding processing or top gluing binding processing), and insertion processing.

The difference point between the screens illustrated in FIGS. 13 and 14 is that via the setting screen illustrated in FIG. 14, keys corresponding to shift sheet discharge processing and mass stacking processing, which cannot be executed when the post-processing is to be executed without printing by the printing apparatus 100, are not displayed. Accordingly, the user cannot select the functions such as shift sheet discharge processing and mass stacking processing via the screen illustrated in FIG. 14.

This is because in this case, a sheet fed from the inserter 200-*d* cannot be conveyed to the sheet processing apparatus 200 that executes shift sheet discharge or mass stacking processing since the sheet processing apparatus 200 that executes shift sheet discharge or mass stacking processing is provided upstream of the inserter 200-*d*.

As described above, the control unit 205 executes control for appropriately displaying the processing that can be selected in executing an inline job on the screen illustrated in FIG. 13 and the processing that can be selected in executing an offline post-processing job on the screen illustrated in FIG. 14. Accordingly, the present exemplary embodiment can enable the operator to appropriately select the post-processing to be executed.

In executing the display in each of the examples illustrated in FIGS. 13 and 14, the control unit 205 acquires a configuration of the sheet processing apparatus 200, which is connected to the printing apparatus 100. Furthermore, the control unit 205 stores the acquired configuration of the sheet processing apparatus 200 on the memory such as the RAM 208. Accordingly, the control unit 205 can determine the presence of the sheet processing apparatus 200 of each type and execute the display in each of the examples illustrated in FIGS. 13 and 14.

In addition, the control unit 205 also stores the order of connection of the plurality of sheet processing apparatuses 200 together with the information about the configuration of each sheet processing apparatus 200. Accordingly, the control unit 205 can execute control for disabling the unselectable post-processing on the screen illustrated in FIG. 14.

It is useful if the control unit 205 recognizes the configurations and the connection order of the plurality of sheet processing apparatuses 200 according to a signal transmitted from each of the sheet processing apparatuses 200 during start-up of the printing system 1000.

In addition, it is also useful if the control unit 205 allows the operator to register information for identifying the type of each of the plurality of sheet processing apparatuses 200 and the connection order and the number of sheet processing apparatuses 200 connected to the printing apparatus 100.

In addition, in the present exemplary embodiment, in setting the type of post-processing to be executed in an off-line job, the user sets the paper feed source of the sheet on which the post-processing is to be performed.

More specifically, for the paper feed source, the user can set either one of the paper feed decks 1 through 3 of the inserter 200-*d* or the inserter of the gluing bookbinding machine 200-*b* or the saddle stitch binding machine 200-*c*. The control unit 205 stores the paper feed source set by the user on the HDD 209. In executing an offline post-processing job, the control unit 205 feeds a sheet from the designated paper feed source and executes post-processing of the designated type on the fed sheet.

The printing system 1000 can store data of a plurality of jobs on the HDD 209. The control unit 205 appropriately loads and executes the job from the HDD 209.

The above-described configuration is a mere example and the present exemplary embodiment is not limited thereto. More specifically, any type of post-processing can be employed as the post-processing that can be executed without performing printing by the printing apparatus 100.

In the present invention, all of the above-described plurality of types of post-processing can be selectively and executed appropriately in each corresponding case. However, the present invention is not limited to this. More specifically, in the present invention, it is also useful if only one type of post-processing can be executed without printing by the printing apparatus 100.

In addition, in the present exemplary embodiment, when a request for executing an offline post-processing job is received from the operator, the control unit 205 executes control for feeding the sheet from the paper feed source to the post-processing unit provided within the sheet processing apparatus 200 without the sheet going through the printing apparatus 100. In this case, after the sheet has been fed into the post-processing unit of the sheet processing apparatus 200, the control unit 205 executes control for performing the post-processing on the sheet fed thereto by using the post-processing unit.

In the above-described manner, the control unit 205 can execute control for causing the sheet processing apparatus 200 to perform the post-processing instructed by the user to be performed for the offline post-processing job without printing by the printing apparatus 100.

In executing an offline post-processing job, it is also useful if the sheet utilized in the offline post-processing job from a paper feed cassette included in the printing apparatus 100. In this case, it is also useful if the user is enabled to select the sheet processing, such as the shift sheet discharge processing or the mass stacking processing, via the screen illustrated in FIG. 9, because the paper feed source of the sheet is provided upstream of the mass stacker 200-*a*. Furthermore, in this case, the control unit 205 executes control for performing the post-processing instructed by the user on the printed product when the sheet is conveyed into the sheet processing apparatus 200.

In the above-described manner, the user executes the setting of the offline job via the screen illustrated in FIG. 9, which is displayed on the operation unit 204 of the printing apparatus 100. After executing the setting of the offline job, the user sets the sheet to the paper feed unit, which is the paper feed source.

In this case, if it is detected that the sheet has been set in the paper feed unit for the time set via the screen illustrated in FIG. 12, then the control unit 205 executes control for automatically starting the post-processing corresponding to the offline job. Accordingly, it becomes unnecessary for the user to return to the printing apparatus 100 to press the start key 5003 after setting the sheet in the paper feed unit that is the paper feed source for the offline job.

Figure 15:
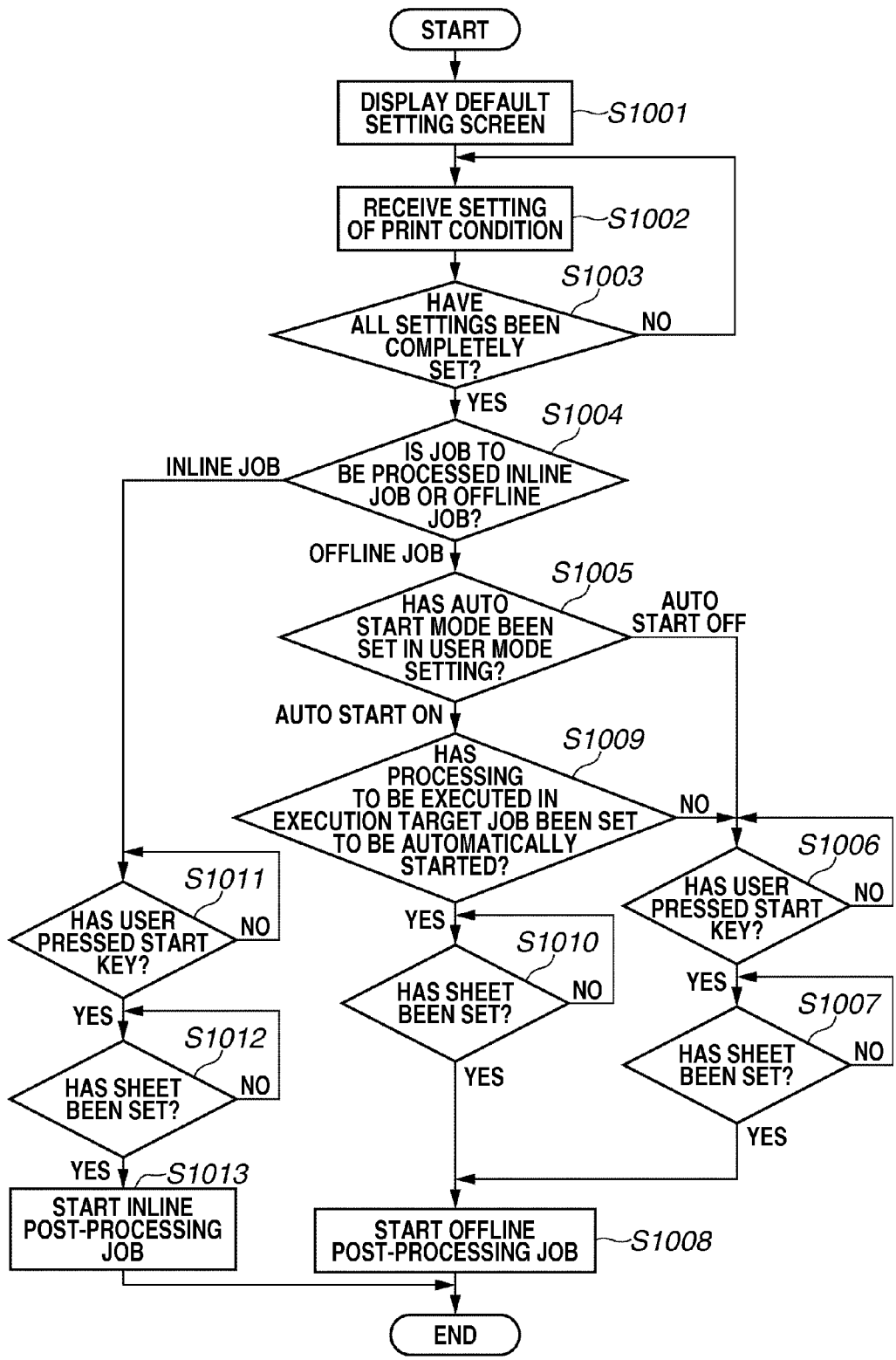
FIG. 15 is a flow chart illustrating an example of processing executed by an image processing apparatus according to an exemplary embodiment of the present invention.

FIG. 15 is a flow chart illustrating an example of processing executed by the printing apparatus 100 according to the present exemplary embodiment. In the present exemplary embodiment, the control unit 205 of the printing apparatus 100 executes control so that the printing apparatus 100 can perform processing and an operation in each step of the flow chart illustrated in FIG. 15.

In addition, program codes for executing the processing in the flow chart illustrated in FIG. 15 on the printing apparatus 100 are previously stored on the ROM 207 of the printing apparatus 100 as program data. The control unit 205 loads and executes the program from the ROM 207 to cause the printing apparatus 100 to execute various exemplary processing and operations illustrated in FIG. 15.

More specifically, the flowchart of FIG. 15 primarily illustrates a series of processing executed for controlling a method of sorting the printed product in executing copy processing by a digital multifunction peripheral (MFP), which is executed under control of the control unit 205.

Referring to FIG. 15, after the printing apparatus 100 is powered on by the operator, the control unit 205 starts the processing. In step S1001, the control unit 205 executes control for displaying a default setting screen of the printing system 1000 on the touch panel portion 4001 of the operation unit 204.

In step S1002, the control unit 205 receives various print condition settings from the operator according to key operations by the operator executed via the operation unit 204. In step S1003, the control unit 205 determines whether the series of settings by the operator has been completely set for the job to be processed.

More specifically, the determination in step S1003 is executed based on whether the OK key 711 (FIG. 13) or the OK key 1401 (FIG. 14) has been pressed by the operator. If it is determined that the operator has pressed the OK key 711 via the setting screen illustrated in FIG. 13 or the OK key 1401 via the setting screen illustrated in FIG. 14, then the control unit 205 determines that the settings by the operator have been completed.

The determination in step S1003 is related to the setting completion status only and is not related to whether the start key 5003 has been pressed by the operator to give an instruction for starting printing.

In step S1004, the control unit 205 determines the type of the job to be processed. More specifically, the control unit 205 determines which of an inline job and an offline post-processing job the job to be processed is.

If it is determined that the OK key 711 has been pressed by the operator via the setting screen illustrated in FIG. 13 under the series of print condition settings executed in step S1002, then the control unit 205 determines that the job to be processed is an inline job. On the other hand, if the OK key 1401 has been pressed via the setting screen illustrated in FIG. 14, then the control unit 205 determines that the job to be processed is an offline post-processing job.

If it is determined that the job to be processed is an offline post-processing job in step S1004, then the processing advances to step S1005.

In the above-described manner, the control unit 205 determines whether to start an offline post-processing job according to the type of the offline post-processing job set by the user via the screen illustrated in FIG. 13. In step S1005, the control unit 205 determines whether the auto start mode has been set as the setting of the user mode.

In the present exemplary embodiment, the "auto start mode" refers to an operation mode for automatically starting the post-processing when a sheet is set in a specific paper feed unit utilized in the job to be processed, as described above with reference to the UI screens illustrated in FIGS. 8 and 9. In the present exemplary embodiment, the auto start mode corresponds to the setting item "offline post-processing job auto start mode" in the user mode setting menu.

In other words, the control unit 205 determines whether the setting value "auto start ON" has been set for the setting item "offline post-processing job auto start mode" in the user mode setting.

If it is determined that the setting value "auto start ON" has not been set, then the processing advances to step S1006 so that the post-processing is not to be automatically started in executing any offline post-processing job. In step S1006, the control unit 205 determines whether a request for starting printing of the job to be processed according to whether the start key 5003 has been pressed by the operator.

More specifically, if the operator has pressed the start key 5003 after setting the series of various print processing conditions for the job to be processed via the operation unit 204, then the control unit 205 detects the request for starting printing (the input by the start key 5003) and determines that the start key 5003 has been pressed (YES in step S1006). Then, the processing advances from step S1006 to step S1007.

In step S1007, the control unit 205 determines whether a sheet has been set in the paper feed unit utilized in the job to be processed. If it is determined that no sheet has been set in the paper feed unit (NO in step S1007), then the control unit 205 repeats the determination in step S1007 and waits until a sheet is supplied by the operator into the paper feed unit.

If it is determined that no sheet has been set in the paper feed unit (NO in step S1007), it is also useful if the control unit 205 displays a message, such as "Please supply sheet.", on the touch panel portion 4001 of the operation unit 204 to prompt the operator to appropriately supply a sheet in the paper feed unit.

On the other hand, if it is determined that a sheet has been set (YES in step S1007), then the processing advances to step S1008. In step S1008, the control unit 205 executes control of the printing system 1000 for performing the operation according to the series of print processing conditions set for the offline post-processing job and received from the operator in step S1002.

On the other hand, if it is determined that the setting value "auto start ON" has been set for the setting item "auto start mode" in the user mode setting in step S1005, then the processing advances to step S1009.

In step S1009, the control unit 205 determines whether the post-processing to be performed in the job to be processed has been set to be automatically started. The determination in step S1009 is executed based on the setting value set for each post-processing for the setting item "auto start ON/OFF setting of each offline post-processing job" in the user mode setting menu illustrated in FIG. 10.

More specifically, if the setting value "auto start OFF" has been set for the corresponding post-processing for the setting item "auto start ON/OFF setting of each offline post-processing job" (NO in step S1009), then the control unit 205 determines that the post-processing is not to be automatically started. In this case, the processing advances to step S1006. In step S1006, the control unit 205 waits until a print start request is given by the operator by pressing the start key 5003 (FIG. 7).

On the other hand, if the setting value "auto start ON" has been set for the corresponding post-processing for the setting item "auto start ON/OFF setting of each offline post-processing job" (YES in step S1009), then the control unit 205 determines that the post-processing is to be automatically started. In this case, the processing advances to step S1010.

In step S1010, the control unit 205 determines whether the sheet necessary for the processing of the job to be processed has been set. In other words, if it is determined that the sheet to be utilized in the job to be processed has been set in a specific paper feed unit (YES in step S1010), then the control unit 205 determines that the sheet has been set.

The specific paper feed unit includes the paper feed unit that the user has set as the paper feed source for the offline job. More specifically, either one of the paper feed decks 1 through 3 of the inserter 200-d or the inserter of the gluing bookbinding machine 200-b or the saddle stitch binding machine 200-c is used as the paper feed unit set as the paper feed source for the offline job in the present exemplary embodiment.

On the other hand, if no sheet set on the specific paper feed unit has been detected, then the control unit 205 determines that no sheet has been set (NO in step S1010). In this case, the control unit 205 repeats the determination in step S1010 and waits until the sheet is set by the user.

In the present exemplary embodiment, as described above with reference to FIG. 12, if it is determined that the state in which the sheet is set in the paper feed unit to be utilized has continued for the "sheet setting acceptance time" set in the user mode or longer, then the control unit 205 determines that the sheet has been set.

As described above, if it is determined that the sheet has been set (YES in step S1010), then the processing advances to step S1008.

In step S1008, the control unit 205 executes control of the printing system 1000 for performing the operation according to the series of print processing conditions set for the offline post-processing job and received from the operator in step S1002.

On the other hand, if it is determined that the job to be processed is an inline job in step S1004, then the processing advances to step S1011. In step S1011, the control unit 205 determines whether the operator has given a request for starting printing of the job to be processed based on whether the operator has pressed the start key 5003.

If the operator has pressed the start key 5003 after setting the series of various print processing conditions for the job to be processed via the operation unit 204, then the control unit 205 detects the request for starting printing (the input by the start key 5003) and determines that the start key 5003 has been pressed (YES in step S1011). Then, the processing advances from step S1011 to step S1012.

In step S1012, the control unit 205 determines whether the sheet has been set in the paper feed unit utilized in the job to be processed. If it is determined that no sheet has been set in the paper feed unit (NO in step S1012), then the control unit 205 repeats the determination in step S1012 and waits until a sheet is supplied by the operator into the paper feed unit.

If it is determined that no sheet has been set in the paper feed unit (NO in step S1012), it is also useful if the control unit 205 displays a message, such as "Please supply sheet.", on the touch panel portion 4001 of the operation unit 204 to prompt the operator to appropriately supply the sheet in the paper feed unit.

On the other hand, if it is determined that the sheet has been set (YES in step S1012), then the processing advances to step S1013. In step S1013, the control unit 205 executes control of the printing system 1000 for performing the operation according to the series of print processing conditions set for the inline job and received from the operator in step S1002. Then, the processing ends.

The control unit 205 of the printing apparatus 100 executes, as described above, the following control according to the setting of the user mode.

More specifically, in executing an offline post-processing job, the control unit 205 permits the auto start of the offline post-processing job after it is determined that the sheet has been set in the paper feed unit only when the setting value "auto start mode" has been set for the user mode setting and the post-processing for the job to be processed has been set to be automatically started.

With the above-described configuration, the present exemplary embodiment can reduce the operator's trouble of giving an instruction for starting the desired post-processing by pressing the start key after setting the sheet in the paper feed unit in executing a specific offline post-processing job.

Now, a second exemplary embodiment of the present invention will be described in detail below. In the above-described first exemplary embodiment, the user is not required to give an instruction for starting the processing by pressing the start key in executing a specific offline post-processing job. Thus, the first exemplary embodiment can improve the operability of the system.

Meanwhile, the user may verify an output product of the offline post-processing job and repeat the supply of the sheet in the paper feed unit to finally obtain a necessary number of output products. Suppose that the post-processing is completed and thus the sheets have been fully consumed. In this case, it is useful if the same post-processing can be automatically started again with the same setting if the sheet is set in the paper feed unit.

Furthermore, in this case, it is also useful if the operator is enabled to explicitly clear the setting after obtaining the necessary number of output products of the offline post-processing job so that the type of the completed post-processing and the setting set thereto are not to be erroneously applied to another job to be input later.

It is further useful if the following function is executed. More specifically, in order to prevent the operator from forgetting clearing the explicit setting after the job is completed, it is useful if the control unit 205 executes control for automatically discontinuing the processing by automatically executing timeout processing and clearing the setting if a state in which no sheet is set in the paper feed unit (a paper consumed state) continues for a predetermined time period or longer.

Accordingly, in the present exemplary embodiment, the user is allowed to set the time in which the offline post-processing mode, which is a mode for automatically starting the same post-processing with the same setting when the sheet is set, is continued (hereinafter simply referred to as a "continuation time").

In addition, in the present exemplary embodiment, even when sheets are fully consumed from the paper feed unit due to the completion of the post-processing on the sheets that have been set in the paper feed unit, the same post-processing is automatically started if the sheet is set within a time period set as the setting value of the continuation time.

In the present exemplary embodiment, the printing system 1000 has the same configuration as that of the printing system 1000 according to the first exemplary embodiment. Now, various control operations executed in the printing system 1000 by using the control unit 205, which is an example of a control unit according to the present exemplary embodiment, will be described in detail below.

Figure 16:
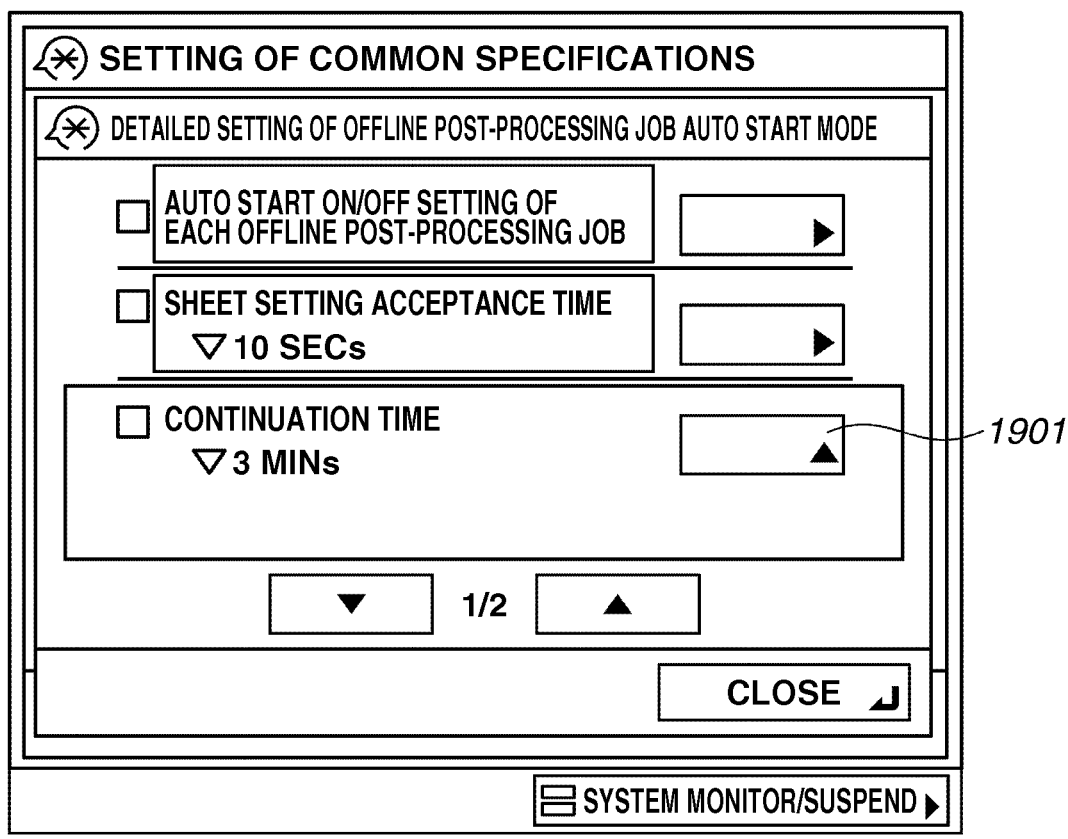
FIG. 16 illustrates an example of a UI displayed on the touch panel portion.

In the present exemplary embodiment, the UI illustrated in FIG. 10 described above in the first exemplary embodiment is replaced by a UI illustrated in FIG. 16.

When the operator presses the detailed setting key 1501 via the screen illustrated in FIG. 9, the control unit 205 executes control for displaying the UI illustrated in FIG. 16 on the touch panel portion 4001. This is the point in difference between the above-described first exemplary embodiment and the present exemplary embodiment.

Figure 17:
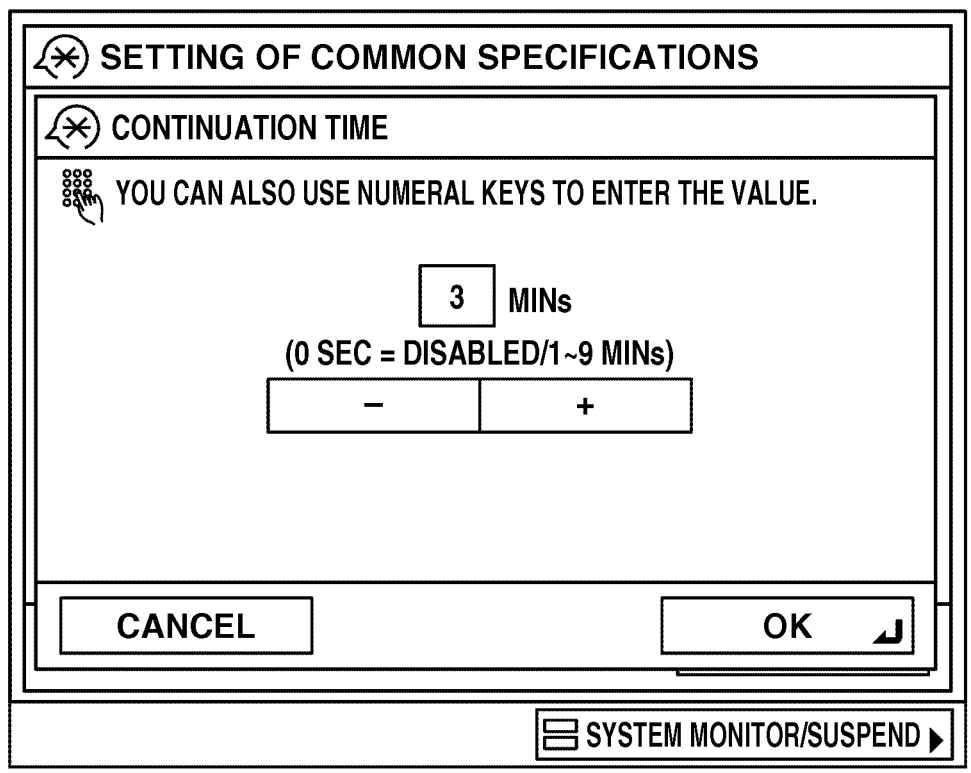
FIG. 17 illustrates an example of a UI displayed on the touch panel portion.

FIGS. 16 and 17 each illustrate an example of a UI displayed on the touch panel portion 4001 illustrated in FIG. 7. The screen illustrated in each of the examples displays a detailed setting item for a setting of the "detailed setting of offline post-processing job auto start mode".

Referring to FIG. 16, the UI screen includes a setting item of the "continuation time" in addition to the setting items illustrated in FIG. 10. In the example illustrated in FIG. 16, the UI screen indicates that the setting value "3 minutes" has been set for the continuation time.

In changing the setting of the continuation time, the operator can press a key 1901 via the screen illustrated in FIG. 16. When the operator presses the key 1901 via the UI screen illustrated in FIG. 16, the control unit 205 executes control for displaying a screen illustrated in FIG. 17 on the touch panel portion 4001.

The UI screen illustrated in FIG. 17 is a setting screen via which the user can register setting information about the continuation time. In the present exemplary embodiment, the continuation time refers to a specific time for automatically starting, when the post-processing on the sheets that have been set in the paper feed unit is completed, the same post-processing with the same setting if the sheet is set within the specific time.

In other words, in the present exemplary embodiment, if the post-processing is completed and thus the sheets have been fully consumed, then the control unit 205 executes control for automatically performing the same post-processing again with the same setting if the sheet is set in the paper feed unit.

With the above-described configuration, the present exemplary embodiment is useful because the user is not required to execute the same setting again. Furthermore, the present exemplary embodiment is useful also because it is enabled to execute the post-processing on the number of sheets larger than the maximum number of sheets that can be stacked on the inserter 200-d.

More specifically, if the setting illustrated in the example in FIG. 17 has been set by the operator and if the sheet is set again within three minutes as set on the screen illustrated in FIG. 17 in this case, then the control unit 205 executes control for performing the same offline post-processing job with the same setting.

On the other hand, if "three minutes", which is the continuation time set in the example illustrated in FIG. 17, has elapsed without the sheet set in the paper feed unit and if the state in which the sheet has been fully consumed continues for three minutes, then the control unit 205 executes timeout processing and automatically clears the setting used in the completed post-processing.

Once the setting is cleared, the control unit 205 does not automatically start the same post-processing even if the sheet is set in the paper feed unit. Furthermore, if a setting value "0 minute" has been set for the continuation time, the control unit 205 ends the same post-processing immediately after the sheet stack set in the post-processing in the completed post-processing is fully consumed.

Figure 18:
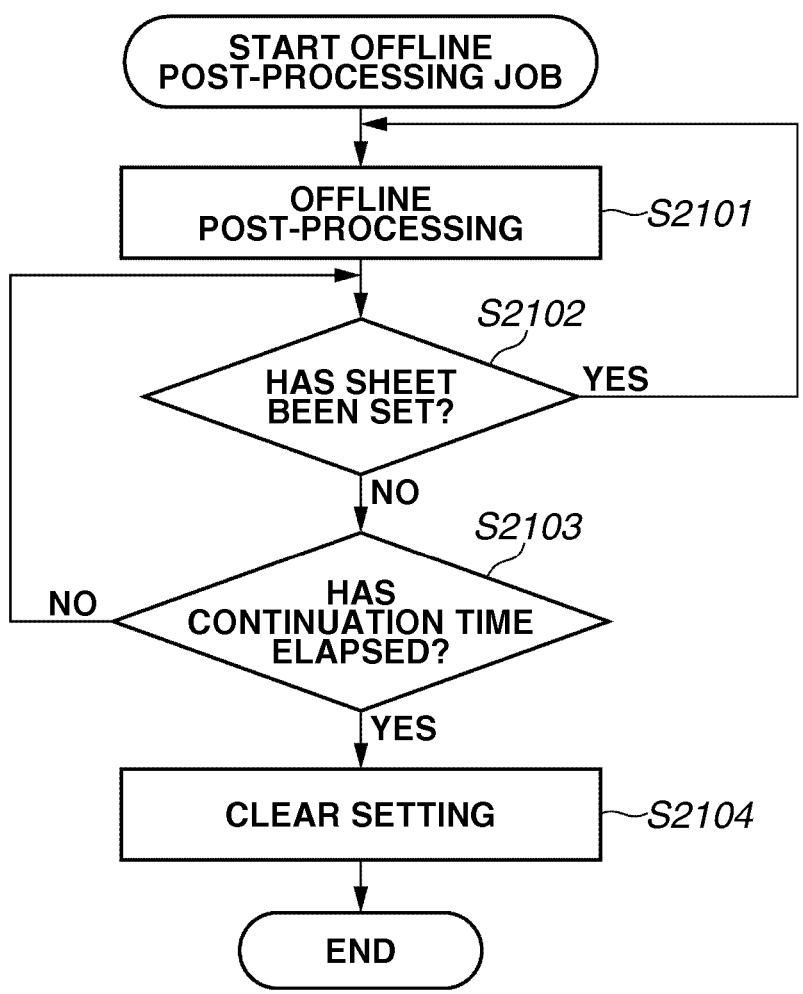
FIG. 18 is a flow chart illustrating an example of processing executed by the image processing apparatus according to an exemplary embodiment of the present invention.

FIG. 18 is a flow chart illustrating an example of processing executed by the printing apparatus 100 according to the present exemplary embodiment. In the present exemplary embodiment, the control unit 205 of the printing apparatus 100 executes control so that the printing apparatus 100 can perform processing and an operation in each step of the flow chart illustrated in FIG. 15. The flow chart illustrated in FIG. 18 particularly illustrates detailed processing executed in step S1008 illustrated in FIG. 15.

In addition, program codes for executing the processing in the flow chart illustrated in FIG. 18 on the printing apparatus 100 are previously stored on the ROM 207 of the printing apparatus 100 as program data. The control unit 205 loads and executes the program from the ROM 207 to cause the printing apparatus 100 to execute various exemplary processing and operations illustrated in FIG. 18.

Referring to FIG. 18, in step S2101, the control unit 205 executes control of the printing system 1000 for performing the operation according to the series of print processing conditions set for the offline post-processing job received from the operator.

When the off-line post-processing is completed, then the processing advances to step S2102. More specifically, the control unit 205 determines that the post-processing is completed when the sheets set in the paper feed unit have been fully consumed or when the user supplies the predetermined number of sheets in the paper feed unit.

In step S2102, the control unit 205 determines whether the sheets have been set in the paper feed unit to be utilized. If it is determined that the sheets have been set in the paper feed unit to be utilized (YES in step S2102), then the processing returns to step S2101. In this case, in step S2101, the control unit 205 executes control of the printing system 1000 for performing the offline post-processing again.

On the other hand, if it is determined that no sheet has been set in the paper feed unit to be utilized (NO in step S2102), then the processing advances to step S2103. In step S2103, the control unit 205 determines whether the state in which no sheet is set has continued for the time equivalent to the continuation time set in the user mode setting.

If it is determined that the state in which no sheet is set has continued for a time less than the continuation time (NO in step S2103), then the processing returns to step S2102. In step S2102, the control unit 205 determines whether the sheets have been set in the paper feed unit again.

On the other hand, if it is determined that the state in which no sheet is set has continued for the continuation time or longer (YES in step S2103), then the processing advances to step S2104.

In step S2104, the control unit 205 clears the setting of the series of the print processing conditions for off-line post-processing. Then, the processing ends.

As described above, when the offline post-processing is completed, the control unit 205 of the printing apparatus 100 executes control of the printing system 1000 for starting the offline post-processing with the same setting if sheets are set in the paper feed unit within the time set for the continuation time in the user mode setting.

Accordingly, the operator is not required to execute the setting again in performing an offline post-processing job. Thus, the operator can execute the same offline post-processing again with the same setting.

As described above, in the present exemplary embodiment, the control unit 205 automatically clears the setting if it is determined that the state in which no sheet is set has continued for the continuation time or longer. Accordingly, the present exemplary embodiment can appropriately prevent such a problem that the setting of completed post-processing is erroneously applied to another job even when the operator has forgotten to clear the setting.

In the present exemplary embodiment, the control unit 205 determines whether sheets have been set according to the "sheet setting acceptance time". However, the present exemplary embodiment is not limited to this.

More specifically, it is also useful if no particular setting information is provided for the user mode setting. In this case, it is useful, in step S1010 in FIG. 10, if the control unit 205 automatically starts the offline post-processing for the job to be processed immediately after it is merely determined that the sheets have been set.

Alternatively, it is also useful if the control unit 205 automatically always starts the offline post-processing for the job to be processed after a predetermined time (three seconds, for example) has elapsed. In the present exemplary embodiment, the setting value "three seconds" can be set as the setting value for the sheet setting acceptance time.

Aspects of the present invention can also be realized by a computer of a system or apparatus (or devices such as a CPU or MPU) that reads out and executes a program recorded on a memory device to perform the functions of the above-described embodiment(s). Aspects of the present invention further can be realized by a method, the steps of which are performed by a computer of a system or apparatus by, for example, reading out and executing a program recorded on a memory device to perform the functions of the above-described embodiment(s). To realize aspects of the present invention, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-145378 filed Jun. 18, 2009, which is hereby incorporated by reference herein in its entirety.

What is claimed is:

1. A printing apparatus, comprising:
a printer configured to print an image on a sheet;
a button or key configured to operate to input a user instruction;
a sheet processor configured to perform sheet processing to a sheet;
a sheet holder configured to hold a sheet to which printing by the printer is not to be performed but the sheet processing by the sheet processor is to be performed;
a sheet detector configured to detect a sheet being held in the sheet holder; and
a setting holder configured to hold a setting relating to, and defining at least one characteristic of, the sheet processing by the sheet processor, wherein, in response to the user instruction via the button or key, the sheet processor performs the sheet processing on the sheet held in the sheet holder based on the setting held by the setting holder such that the setting affects how the sheet processing is performed; and
at least one processor that operates to clear the setting held by the setting holder after the sheet processor performs the sheet processing,
wherein the at least one processor is configured (i) to clear the setting held by the setting holder if a predetermined time elapses in a state that the sheet detector detects no sheet in the sheet holder after the sheet processor performs the sheet processing based on the setting held by the setting holder in response to the user instruction via the button or key, and (ii) not to clear the setting held by the setting holder if the sheet detector detects a sheet newly set in the sheet holder until the predetermined time elapses after the sheet processor performs the sheet processing based on the setting held by the setting holder in response to the user instruction via the button or key so as to cause the sheet processor to perform the sheet processing on the newly set sheet based on the setting held by the setting holder.

2. The printing apparatus according to claim 1, wherein the sheet processing includes a stapling processing.

3. The printing apparatus according to claim 1, wherein the at least one processor is further configured to change the predetermined time based on a user operation.

4. The printing apparatus according to claim 1, wherein, in a case where a first mode is set, the sheet processor is configured to perform the sheet processing in response to the user instruction, and wherein, in a case where a second mode is set, the sheet processor is configured to automatically perform the sheet processing in response to the sheet being newly set.

5. The printing apparatus according to claim 1, wherein the sheet processor further is configured to be able to perform the sheet processing on a sheet on which the image is printed by the printer.

6. The printing apparatus of claim 1, wherein the setting changes how the sheet processing is performed.

7. The printing apparatus of claim 1, wherein the setting is held continuously until the setting is cleared.

8. The printing apparatus of claim 1, wherein the user instruction triggers the performance of the sheet processing on the sheet.

9. The printing apparatus of claim 8, wherein the sheet processing is triggered by the user instruction such that the sheet processing is not triggered by, or started in response to, the setting of the new sheet on or in the sheet holder.

10. The printing apparatus of claim 1, wherein the setting is set before the user instruction is received.

11. The printing apparatus of claim 1, wherein the received user instruction is a manually input user instruction.

12. The printing apparatus of claim 11,
wherein the at least one processor is further configured to determine whether a sheet is or is not in the sheet holder.

13. The printing apparatus of claim 1, wherein the at least one processor unit is further configured to receive at least a manually input user instruction.

14. The printing apparatus of claim 13, wherein the at least one processor is further configured to determine whether a sheet is or is not in the sheet holder.

15. The printing apparatus of claim 1, wherein the sheet processing operates to physically affect the sheet or to change a structure of the sheet from the structure of the sheet existing prior to performance of the sheet processing.

16. The printing apparatus of claim 1, wherein the sheet processing is performed without performing the printing by the printer.

17. A control method for controlling a printing apparatus having a printer configured to print an image on a sheet, a sheet processor configured to perform sheet processing to a sheet, a sheet holder configured to hold a sheet to which printing by the printer is not to be performed but the sheet processing by the sheet processor is to be performed, a detector configured to detect a sheet in the sheet holder, and a button or key configured to operate to input a user instruction, the control method comprising:
holding a sheet to which printing by the printer is not to be performed but the sheet processing by the sheet processor is to be performed;
holding a setting relating to, and defining at least one characteristic of, the sheet processing by the sheet processor, wherein the sheet processor performs the sheet processing on the held sheet based on the held setting in response to the user instruction via the button or key and being received such that the setting affects how the sheet processing is performed; and
(i) clearing the setting if a predetermined time elapses in a state that the detector detects no sheet in the sheet holder after the sheet processor performs the sheet processing based on the setting held by the setting holder in response to the user instruction via the button or key, and
(ii) controlling not to clear the setting if the detector detects a sheet newly set in the sheet holder in a time period before the predetermined time elapses after the sheet processor performs the sheet processing based on the setting held by the setting holder in response to the user instruction via the button or key so as to cause the sheet processor to perform the sheet processing on the newly set sheet based on the setting held by the setting holder.

18. A non-transitory computer-readable storage medium storing a program to cause a printing apparatus, having a printer configured to print an image on a sheet, a sheet processor configured to perform sheet processing to a sheet, a sheet holder configured to hold a sheet to which printing by the printer is not to be performed but the sheet processing by the sheet processor is to be performed, a detector configured to detect a sheet in the sheet holder and a button or key configured to operate to input a user instruction, to perform a control method, the control method comprising:

holding a sheet to which printing by the printer is not to be performed but the sheet processing by the sheet processor is to be performed;

holding a setting relating to, and defining at least one characteristic, the sheet processing by the sheet processor, wherein the sheet processor performs the sheet processing on the held sheet based on the held setting in response to the user instruction via the button or key and being received such that the setting affects how the sheet processing is performed; and (i) clearing the setting if a predetermined time elapses in a state that the detector detects no sheet in the sheet holder after the sheet processor performs the sheet processing based on the setting held by the setting holder in response to the user instruction via the button or key, and (ii) controlling not to clear the setting if the detector detects a sheet newly set in the sheet holder in a time period before the predetermined time elapses after the sheet processor performs the sheet processing based on the setting held by the setting holder in response to the user instruction via the button or key so as to cause the sheet processor to perform the sheet processing on the newly set sheet based on the setting held by the setting holder.

* * * * *